United States Patent
Bao et al.

(10) Patent No.: US 11,513,789 B2
(45) Date of Patent: *Nov. 29, 2022

(54) APPLICATION DEPLOYMENT METHOD, APPARATUS, AND SYSTEM

(71) Applicant: Huawei Technologies Co., Ltd., Shenzhen (CN)

(72) Inventors: Shuai Bao, Shenzhen (CN); Jingsha Wang, Xi'an (CN); Haixing Wu, Xi'an (CN); Xiaolong Tian, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,660

(22) Filed: Jan. 25, 2022

(65) Prior Publication Data

US 2022/0229652 A1  Jul. 21, 2022

Related U.S. Application Data

(63) Continuation of application No. 16/822,765, filed on Mar. 18, 2020, now Pat. No. 11,249,744, which is a continuation of application No. PCT/CN2017/102331, filed on Sep. 19, 2017.

(51) Int. Cl.
  *G06F 9/44* (2018.01)
  *G06F 8/65* (2018.01)
  *G06F 9/50* (2006.01)

(52) U.S. Cl.
  CPC .............. *G06F 8/65* (2013.01); *G06F 9/5055* (2013.01)

(58) Field of Classification Search
  CPC ................................ G06F 8/65; G06F 9/5055
  USPC ................. 717/101–103, 168–172, 176–178
  See application file for complete search history.

(56) References Cited

U.S. PATENT DOCUMENTS

| | | | |
|---|---|---|---|
| 8,495,570 B2 | 7/2013 | Fortune et al. | |
| 8,914,768 B2 * | 12/2014 | Karnik | G06F 8/35 717/104 |
| 9,047,133 B2 | 6/2015 | Winterfeldt et al. | |
| 9,052,961 B2 | 6/2015 | Mangtani et al. | |
| 9,244,669 B2 | 1/2016 | Govindaraju et al. | |
| 9,432,350 B2 | 8/2016 | Anderson et al. | |

(Continued)

FOREIGN PATENT DOCUMENTS

| | | |
|---|---|---|
| CN | 103197952 A | 7/2013 |
| CN | 103455346 A | 12/2013 |

(Continued)

OTHER PUBLICATIONS

Ghezzi, G., et al., "An Architectural Blueprint for a Pluggable Version Control System for Software (Evolution) Analysis," IEEE, 2012, pp. 13-18.

(Continued)

*Primary Examiner* — Ted T. Vo

(74) *Attorney, Agent, or Firm* — Conley Rose, P.C.

(57) ABSTRACT

An application deployment method includes obtaining application blueprints and resource indexes of a to-be-deployed application that are allocated to a deployment apparatus, establishing n correspondences among the application blueprints, the resource indexes, and agent identifiers based on the application blueprints and the resource indexes of the to-be-deployed application, and sending a deployment command to the deployment apparatus.

20 Claims, 11 Drawing Sheets

(56) References Cited

U.S. PATENT DOCUMENTS

| | | | |
|---|---|---|---|
| 9,645,805 B2 | 5/2017 | Govindaraju et al. | |
| 9,667,746 B2 | 5/2017 | Bauer et al. | |
| 10,095,496 B2* | 10/2018 | Winterfeldt | G06F 8/60 |
| 10,104,053 B2 | 10/2018 | Wipfel et al. | |
| 10,284,685 B2 | 5/2019 | Bauer et al. | |
| 10,880,188 B1 | 12/2020 | Rachamadugu | |
| 10,949,903 B2* | 3/2021 | Padmanabh | G06F 9/547 |
| 10,970,057 B2* | 4/2021 | Hassine | H04L 41/0866 |
| 11,134,010 B2* | 9/2021 | Mehmedagic | H04L 67/133 |
| 11,249,744 B2* | 2/2022 | Bao | G06F 9/5055 |
| 2013/0232480 A1 | 9/2013 | Winterfeldt et al. | |
| 2013/0232498 A1 | 9/2013 | Mangtani et al. | |
| 2014/0325503 A1 | 10/2014 | Li | |
| 2015/0304175 A1 | 10/2015 | Maes et al. | |
| 2015/0347170 A1 | 12/2015 | Mohammed et al. | |
| 2015/0378702 A1 | 12/2015 | Govindaraju et al. | |
| 2016/0366243 A1 | 12/2016 | Chefalas et al. | |

FOREIGN PATENT DOCUMENTS

| | | |
|---|---|---|
| CN | 103631623 A | 3/2014 |
| CN | 104813285 A | 7/2015 |
| CN | 105760199 A | 7/2016 |
| CN | 106663023 A | 5/2017 |

OTHER PUBLICATIONS

Yan, M., et al., "Spatial Data Resource Index in Grid Environment," 2009 Eighth International Conference on Grid and Cooperative Computing, pp. 116-120.

Miglierina, M., "Application Deployment and Management in the Cloud," 2014 16th International Symposium on Symbolic and Numeric Algorithms for Scientific Computing, pp. 422-428.

\* cited by examiner

APPLICATION DEPLOYMENT METHOD, APPARATUS, AND SYSTEM

CROSS-REFERENCE TO RELATED APPLICATIONS

This is a continuation of U.S. patent application Ser. No. 16/822,765 filed on Mar. 18, 2020, which is a continuation of International Patent Application No. PCT/CN2017/102331 filed on Sep. 19, 2017. Both of the aforementioned applications are hereby incorporated by reference in their entireties.

TECHNICAL FIELD

This application relates to the field of cloud computing, and in particular, to an application deployment method, an apparatus, and a system.

BACKGROUND

Application deployment is a process in which a packaged application resource is deployed on a specified server based on a series of orchestrated task procedures, and the process includes code packaging, environment creation, context preparation, resource copying, application starting, operation configuration, system strengthening, and the like.

Current application deployment is procedure-oriented. A corresponding application deployment system includes a deployment engine, a resource server, and a deployment apparatus (agent). After the deployment engine starts, a task script and an application resource that is stored in the resource server are loaded. After receiving a deployment instruction triggered by a person or a third party, the deployment engine sends the task script and the application resource to the deployment apparatus, and the deployment apparatus performs application deployment based on the task script and the application resource.

However, during application deployment, technical personnel need to develop a corresponding task script, but writing of the task script is complex and takes a relatively long writing period. Consequently, application deployment complexity is relatively high, and deployment efficiency is relatively low.

SUMMARY

This application provides an application deployment method, an apparatus, and a system, to resolve a problem that application deployment complexity is relatively high and deployment efficiency is relatively low. Technical solutions are as follows.

According to a first aspect, an application deployment method is provided, where the method is applied to a registration center, and the method includes obtaining application blueprints and resource indexes of a to-be-deployed application that are allocated to a deployment apparatus, where the application blueprints include resource storage paths and executable commands, and the resource indexes include resource obtaining addresses, establishing n correspondences among the application blueprints, the resource indexes, and agent identifiers based on the application blueprints and the resource indexes of the to-be-deployed application, where the agent identifier is used to uniquely identify the deployment apparatus, and n is an integer greater than or equal to 1, and sending the deployment command to the deployment apparatus, where the deployment command includes the n correspondences, and the deployment command is used to instruct the deployment apparatus to obtain an application resource based on the resource obtaining address in each correspondence, store the application resource based on the resource storage path, and execute the executable command after storing the application resource.

The application blueprints and the resource indexes have simple formats. Therefore, a correspondence required during application deployment can be quickly written with only simple basic knowledge, and there is no need to write a complex task script, thereby reducing an orchestration requirement. Therefore, application deployment complexity is reduced, and application deployment efficiency is increased.

After completing execution of an executable command in a correspondence each time, the deployment apparatus may feedback a corresponding execution result to the registration center using a deployment response. Alternatively, after completing execution of executable commands in a plurality of correspondences, the deployment apparatus feeds back execution results of the plurality of sets of executable commands to the registration center using a same deployment response. Correspondingly, after receiving the deployment response, the registration center may determine a subsequent operation based on the execution results carried in the deployment response. In this way, problems occurring during interaction between the registration center and the deployment apparatus can be reduced. Therefore, optionally, the method further includes receiving, by the registration center, the deployment response sent by the deployment apparatus, where the deployment response includes the execution results obtained after the deployment apparatus executes the executable commands.

Optionally, in different application environments, integrated to-be-deployed resources to be deployed (that is, all resources to be deployed) for the to-be-deployed application are different. The integrated to-be-deployed resources may be deployed in one or more deployment apparatuses based on different actual deployment scenarios and/or application environments. Based on this, for one deployment apparatus, obtaining application blueprints and resource indexes of a to-be-deployed application that are allocated to a deployment apparatus includes receiving m resource indexes of the to-be-deployed application, where application resources corresponding to the m resource indexes constitute an integrated to-be-deployed resource of the to-be-deployed application in a specified application environment, and m is an integer greater than or equal to 1, receiving p application blueprints of the to-be-deployed application, where storage paths of the p application blueprints correspond to the m resource indexes, and after a subscription instruction of the deployment apparatus is received, obtaining at least one of the m resource indexes as a resource index that is of the to-be-deployed application and that is allocated to the deployment apparatus, and obtaining the p application blueprints as application blueprints of the to-be-deployed application that are allocated to the deployment apparatus, when the deployment apparatus is an apparatus in the specified application environment.

Optionally, obtaining at least one of the m resource indexes as a resource index that is of the to-be-deployed application and that is allocated to the deployment apparatus, and obtaining the p application blueprints as application blueprints of the to-be-deployed application that are allocated to the deployment apparatus, when the deployment apparatus is an apparatus in the specified application environment includes determining at least one target deployment apparatus used to deploy the integrated to-be-deployed resource in the specified application environment, where the at least one target deployment apparatus includes the deployment apparatus, allocating a resource index of the m resource indexes to each target deployment apparatus, and allocating an application blueprint of the p application blueprints to each target deployment apparatus.

Optionally, because of different deployment scenarios and/or a change in an application environment (for example, upgrade or rollback of the application environment), some elements in the n correspondences may change. Correspondingly, the registration center sends an update command to the deployment apparatus. The application deployment method further includes sending a first update command to the deployment apparatus when any element in a first correspondence changes, where the first update command includes a second correspondence, the second correspondence is an updated first correspondence, an application blueprint identifier in the first correspondence is the same as an application blueprint identifier in the second correspondence, and the first correspondence is any one of the n correspondences.

In actual application, each deployment apparatus needs to first register with the registration center such that the registration center can perform a subsequent management and application deployment process. Therefore, optionally, before obtaining application blueprints and resource indexes that are allocated to a deployment apparatus, the method further includes receiving a registration request sent by the deployment apparatus, allocating the agent identifier to the deployment apparatus based on the registration request, and sending a registration request response to the deployment apparatus, where the registration request response includes the agent identifier.

Optionally, the registration center may further configure a first application programming interface and a second application programming interface, the first application programming interface is an interface used to interact with the deployment apparatus, and the second application programming interface is an interface used to interact with a control end. It should be noted that the registration center may further interact with the control end using a specified operation page, and the specified operation page may be a Hyper Text Markup Language (HTML) page, for example, an HTML5 page. In this embodiment of this application, the registration center obtains, through the second application programming interface or using the specified operation page, an application blueprint and a resource index that are provided by the control end, and the registration center may further provide a correspondence between an application blueprint and a resource index to the deployment apparatus through the first application programming interface.

For example, sending the deployment command to the deployment apparatus includes sending the deployment command to the deployment apparatus through a first application programming interface of the registration center.

Optionally, obtaining application blueprints and resource indexes that are allocated to a deployment apparatus includes obtaining, through the first application programming interface of the registration center or using the specified operation page, the application blueprints allocated to the deployment apparatus, and obtaining, through the first application programming interface of the registration center or using the specified operation page, the resource indexes allocated to the deployment apparatus.

Optionally, the application resource includes an application installation resource, an application configuration file, an executable file, a code file, or a differential application package.

According to a second aspect, an application deployment method is provided, where the method is applied to a deployment apparatus, and the method includes receiving a deployment command sent by the registration center, where the deployment command includes n correspondences among application blueprints, resource indexes, and agent identifiers, the agent identifier is used to uniquely identify the deployment apparatus, the application blueprints include resource storage paths and executable commands, and the resource indexes include resource obtaining addresses, and obtaining an application resource based on the resource obtaining address in each correspondence, storing the application resource based on the resource storage path, and executing the executable command after storing the application resource.

The application blueprints and the resource indexes have simple formats. Therefore, a correspondence required during application deployment can be quickly written with only simple basic knowledge, and there is no need to write a complex task script, thereby reducing an orchestration requirement. Therefore, application deployment complexity is reduced, and application deployment efficiency is increased.

After completing execution of an executable command in a correspondence each time, the deployment apparatus may feedback a corresponding execution result to the registration center using a deployment response. Alternatively, after completing execution of executable commands in a plurality of correspondences, the deployment apparatus feeds back execution results of the plurality of sets of executable commands to the registration center using a same deployment response. Correspondingly, after receiving the deployment response, the registration center may determine a subsequent operation based on the execution results carried in the deployment response. In this way, problems occurring during interaction between the registration center and the deployment apparatus can be reduced.

Therefore, optionally, the deployment apparatus may send the deployment response to the registration center after executing the executable command, and the deployment response includes the execution result obtained after the deployment apparatus executes the executable command.

Optionally, the application blueprints further include application blueprint identifiers, and application blueprint identifiers allocated by the registration center are in a one-to-one correspondence with application resources stored in a resource server. Because of different deployment scenarios and/or a change in an application environment (for example, upgrade or rollback of the application environment), some elements in the n correspondences may change. Correspondingly, the registration center sends an update command to the deployment apparatus. The application deployment method further includes receiving a first update command sent by the registration center, where the first update command is a command sent by the registration center to the deployment apparatus after the registration center detects that any element in a first correspondence changes, the first update command includes a second correspondence, the first correspondence is any one of the n correspondences, the second correspondence is an updated first correspondence, and an application blueprint identifier in the first correspondence is the same as an application blueprint identifier in the second correspondence, detecting a target element that changes in the second correspondence, and performing, based on the second correspondence, an action corresponding to the target element.

Optionally, performing, based on the second correspondence, an action corresponding to the target element includes, when the target element includes a resource obtaining address and/or a resource storage path, obtaining an application resource based on the resource obtaining address in the second correspondence, and executing an executable command in the second correspondence after storing the application resource based on the resource storage path in the second correspondence, and when the target element is the executable command, executing the executable command in the second correspondence.

In addition, performing, based on the second correspondence, an action corresponding to the target element includes, when the target element includes a resource storage path, obtaining a locally stored application resource based on a first resource storage path in the first correspondence, and storing the application resource again based on a second resource storage path in the second correspondence, and replacing the locally stored first correspondence with the second correspondence.

If an application resource downloaded based on the first correspondence is reserved, quick resource rollback may be further implemented in a subsequent process. The quick resource rollback process may have the following two implementations.

Optionally, in a first implementation, the quick rollback process includes recording a correspondence between the first resource storage path and the second resource storage path after the obtaining a locally stored application resource based on a first resource storage path in the first correspondence, and storing the application resource again based on a second resource storage path in the second correspondence, receiving a rollback instruction sent by the registration center, where the rollback instruction is used to instruct to roll back a storage status of an application resource to a previous storage status, obtaining the second resource storage path from the currently stored second correspondence, obtaining the first resource storage path based on the correspondence between the first resource storage path and the second resource storage path, and updating the second resource storage path in the currently stored second correspondence to the first resource storage path.

Optionally, in a second implementation, the quick rollback process includes recording a correspondence between the first resource storage path and the second resource storage path after the obtaining a locally stored application resource based on a first resource storage path in the first correspondence, and storing the application resource again based on a second resource storage path in the second correspondence, receiving a second update command sent by the registration center, where the second update command is a command sent by the registration center to the deployment apparatus after the registration center detects that any element in the second correspondence changes, the update command includes a third correspondence, and the third correspondence is an updated second correspondence, and when only resource storage paths in the third correspondence and the second correspondence are different, and the resource storage path in the third correspondence is the same as the first resource storage path recorded in the correspondence, updating the second resource storage path in the second correspondence to the first resource storage path.

In actual application, each deployment apparatus needs to first register with the registration center such that the registration center can perform a subsequent management and application deployment process. Therefore, optionally, before receiving a deployment command sent by the registration center, the method further includes sending a registration request to the registration center, and receiving a registration request response sent by the registration center, where the registration request response includes the agent identifier.

Optionally, sending a registration request to the registration center includes obtaining configuration information, where the configuration information includes information about a first application programming interface of the registration center, and sending the registration request to the registration center through the first application programming interface of the registration center, and receiving a deployment command sent by the registration center includes receiving, through the first application programming interface of the registration center, the deployment command sent by the registration center.

According to a third aspect, a registration center is provided, where the registration center includes at least one module, and the at least one module is configured to perform the application deployment method provided in any one of the first aspect or the optional manners of the first aspect.

According to a fourth aspect, a deployment apparatus is provided, where the deployment apparatus includes at least one module, and the at least one module is configured to perform the application deployment method provided in any one of the second aspect or the optional manners of the second aspect.

According to a fifth aspect, an application deployment system is provided, where the application deployment system includes any registration center in the third aspect and any deployment apparatus in the fourth aspect.

According to a sixth aspect, a computer readable storage medium is provided, where the computer readable storage medium stores an instruction, and when the computer readable storage medium runs on a processing component, the processing component is enabled to perform the application deployment method provided in any one of the first aspect or the optional manners of the first aspect, or the processing component is enabled to perform the application deployment method provided in any one of the second aspect or the optional manners of the second aspect. The computer readable storage medium may be a nonvolatile readable storage medium.

According to a seventh aspect, a computer program product including an instruction is provided, where when the computer program product runs on a processing component, the processing component is enabled to perform the application deployment method provided in any one of the first aspect or the optional manners of the first aspect, or the processing component is enabled to perform the application deployment method provided in any one of the second aspect or the optional manners of the second aspect.

Advantageous effects brought by the technical solutions provided in this application are as follows.

According to the application deployment method, the apparatus, and the system that are provided in the embodiments of this application, because the application blueprints and the resource indexes have simple formats, a correspondence required during application deployment can be quickly written with only simple basic knowledge, and there is no need to write a complex task script, thereby reducing an orchestration requirement. Therefore, application deployment complexity is reduced, and application deployment efficiency is increased.

Further, according to the application deployment method, the apparatus, and the system that are provided in the embodiments of this application, because the registration center may establish the correspondences among the application blueprints, the resource indexes, and the agent identifiers, the execution deployment apparatus may obtain and store an application resource based on the correspondence, execute an executable command, and deploy the application resource. Because the application blueprints and the resource indexes have simple formats, the correspondence required during application deployment can be quickly written with only simple basic knowledge. There is no need to develop different task scripts in different application environments, and environment adaptation can be implemented provided that a correspondence is established or adjusted. Therefore, application deployment complexity is effectively reduced, and deployment efficiency is increased.

According to the application deployment method, the apparatus, and the system that are provided in the embodiments of this application, because an executable command is added after an application blueprint, the deployment apparatus can execute the executable command after downloading an application resource. A process such as copying, transmission, downloading, decompressing, or installation can be implemented provided that technical personnel configure a proper executable command on the application blueprint. Therefore, no special script needs to be written, thereby reducing a time consumed by script writing. In addition, because the application blueprints and the resource indexes have simple formats, an orchestration requirement is also reduced, and a correspondence required during application deployment can be quickly written with only simple basic knowledge. Further, plug and play may be supported in an application relationship deployment process, and application deployment can be quickly implemented.

According to the application deployment method, the apparatus, and the system that are provided in the embodiments of this application, for an application, only at least one correspondence for application deployment needs to be established. The correspondence only needs to be newly established or adjusted in different application environments. The correspondence has relatively high reusability.

According to the application deployment method, the apparatus, and the system that are provided in the embodiments of this application, because the correspondence for application deployment is actually concatenation of some simple strings, occupied network bandwidth is relatively low, thereby leading to relatively little impact on load of the registration center.

Further, in this application, the application resource may be an application installation package, an application plug-in, an application configuration file, an executable file, a code file, or a differential application package. When the application resource is the application plug-in or a differential application resource, an incremental update of an application can be implemented, a network bandwidth requirement can be reduced, and an application deployment speed can be increased.

DESCRIPTION OF EMBODIMENTS

Figure 1A:
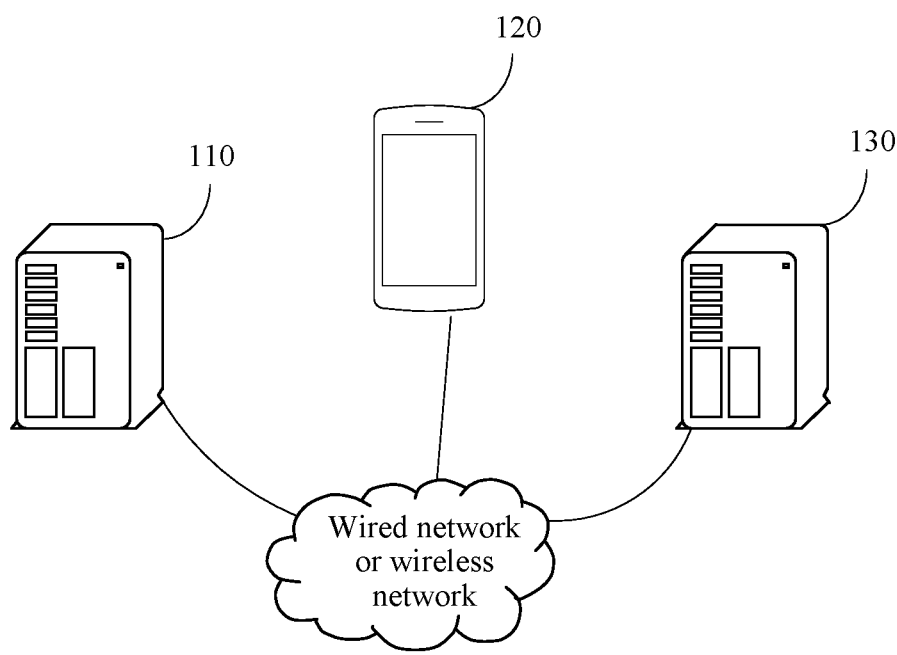
FIG. 1A is a schematic diagram of an implementation environment of an application deployment system in an application deployment method according to an embodiment of this application.

FIG. 1A is a schematic diagram of an implementation environment of an application deployment system in an application deployment method according to some embodiments of this application. The application deployment system may be applied to a system on a platform-as-a-service platform, a mobile application update system, or a service deployment engine. The application deployment system may include a registration center 110, at least one deployment apparatus 120, and a resource server 130.

The registration center 110 may be a server, or a server cluster including several servers, or a cloud computing service center. The deployment apparatus 120 may be an application server, a physical machine, a virtual machine, an isolation server, a smartphone, a computer, a multimedia player, an e-reader, a wearable device, or the like. The deployment apparatus 120 is an apparatus on which agent software is installed. The deployment apparatus 120 implements application deployment using the agent software. An application environment is created on the deployment apparatus 120, the application environment is an environment supporting application deployment, and the application environment may be an operating system or a container environment. The resource server 130 may be a server, or a server cluster including several servers, or a cloud computing service center. The resource server 130 is configured to store a to-be-deployed application resource, and the application resource may include a resource required for running an application, for example, an application installation resource, an application plug-in, an application configuration file, a database configuration file, an executable file, a code file, or a differential application package. The application installation resource may include an application body, a database resource, a load balancing resource, and/or the like. Further, the application body may include an installation package or a compressed package of the application.

A connection may be established between the registration center 110 and the deployment apparatus 120 through a wired network or a wireless network.

Figure 1B:
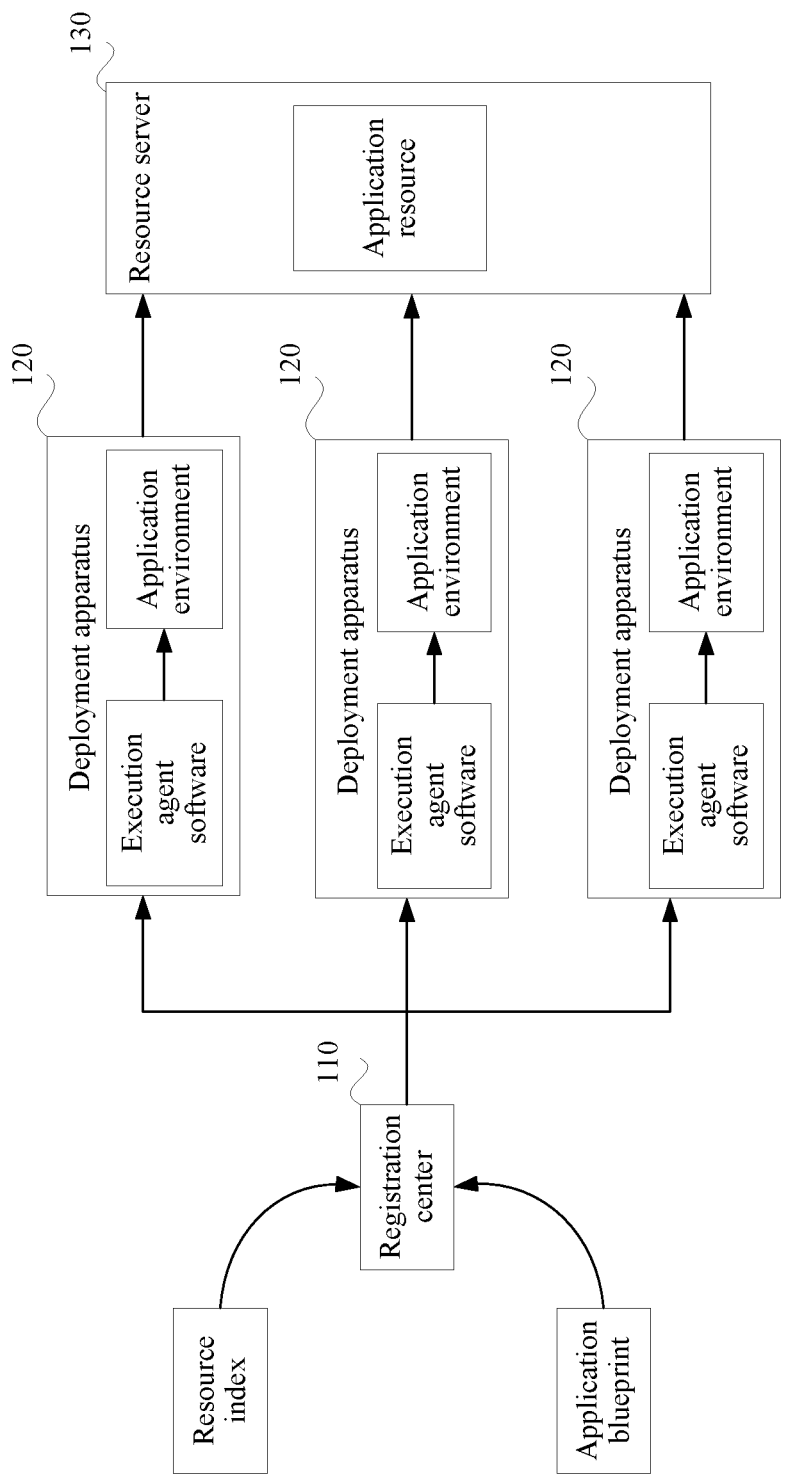
FIG. 1B is a schematic diagram of an implementation environment of an application deployment system in another application deployment method according to an embodiment of this application.

Further, as shown in FIG. 1B, the registration center 110 may obtain application blueprints and resource indexes of a to-be-deployed application that are allocated to the deployment apparatus 120, and establish n correspondences among the application blueprints, the resource indexes, and agent identifiers based on the application blueprints and the resource indexes of the to-be-deployed application, where the agent identifier is used to uniquely identify the deployment apparatus, and n is an integer greater than or equal to 1. After the registration center 110 allocates the n correspondences to the corresponding deployment apparatus 120, the deployment apparatus 120 can obtain application resources from the resource server 130 based on the n correspondences, and perform corresponding resource deployment.

The application blueprints include at least resource storage paths and executable commands (or executable instructions), and the resource storage paths are used to indicate paths on which the application resources are stored after the application resources are obtained, for example, "C:\Program Files\appX". The executable commands are commands that the deployment apparatus 120 needs to execute after storing the obtained application resources based on the resource storage paths in the application blueprints, and the executable commands may include a system update command, a restart command, a power-off command, an installation command, an application running command, and/or the like. The executable commands may be input by a control end, and the control end may be a person or a third-party system (for example, a control system running on a server).

Because the deployment apparatus 120 may need to perform an operation, such as restarting a system, after obtaining the application resources, adding the executable command to the application blueprint may enable the deployment apparatus 120 to execute the corresponding command after the application resource is obtained, to download the application resource, and automate and streamline execution of the corresponding command.

In an application, in some scenarios, such as a resource coverage scenario or a certificate access scenario, a corresponding executable command may not exist. Therefore, an element of the executable command in the application blueprint is null. In this case, a location of the executable command may be further set in the application blueprint, and a character of the location is "NULL", or no location of the executable command may be set in the application blueprint. This is not limited in this embodiment of this application.

Further, to accurately identify the application blueprint, the application blueprint may further include an application blueprint identifier (blueprint_id) used to uniquely identify the application blueprint, and the application blueprint identifier may be a string, for example, a combination of names, code, serial numbers, or preset characters (for example, numbers), for example, blueprint_001. In actual application, application blueprint identifiers allocated by the registration center 110 may correspond to types of the application resources stored in the resource server 130. For example, a type of an application resource is an appX installation package (that is, the application resource is an installation package of an application appX), the appX installation package has three versions, an appX001 installation package, an appX002 installation package, and an appX003 installation package. In correspondences established for the appX installation package, application blueprint identifiers may all be appXblueprint_001.

It can be learned from above that the application blueprint may include at least two elements, every two elements may be isolated using a preset separator, and the separator may be an underline, a semicolon, a colon, a space, or the like. For example, assuming that the application blueprint includes three elements in total: the application blueprint identifier, a resource storage path, and an executable command, the application blueprint identifier is blueprint_id, the resource storage path is resource_path, the executable command is refresh_cmd, and the separator is a colon, a format of the application blueprint may be blueprint_id:resource_path:refresh_cmd. If the executable command is null, the format of the application blueprint may be blueprint_id:resource_path:NULL or blueprint_id:resource_path.

The resource index includes at least the resource obtaining address. The resource obtaining address is used to indicate an address used for obtaining an application resource. The resource obtaining address may be a uniform resource identifier (URI). A format of the URI usually includes two parts. The first part is a resource obtaining protocol (or referred to as a serving manner), such as a Hypertext Transfer Protocol (HTTP), a File Transfer Protocol (FTP), or a Network File System (NFS) protocol. The second part is a specific resource obtaining address, and the specific resource obtaining address includes an Internet Protocol (IP) address (sometimes an interface number is also included) of a host in which an application resource is stored and a specific address of the application resource in the host, such as a directory and a file name. In some scenarios, the specific address of the application resource in the host may be null. For example, the resource obtaining address is "http:/appX.com/".

Further, to accurately identify the resource index, the resource index may further include a resource index identifier (index_id) used to uniquely identify the resource index, and the resource index identifier may be a string, for example, a combination of names, code, serial numbers, or preset characters (for example, numbers), for example, index_001.

It can be learned from above that the resource index may include at least one element. When the resource index includes at least two elements, every two elements may be isolated using a preset separator, and the separator may be an underline, a semicolon, a colon, a space, or the like. For example, assuming that the resource index includes the resource index identifier and a resource obtaining address, the resource index identifier is index_id, the resource obtaining address is resource_uri, and the separator is a colon, a format of the resource index may be index_id:resource_uri.

Further, the registration center 110 may further configure a first application programming interface and a second application programming interface. The first application programming interface is an interface used to interact with the deployment apparatus 120, and the second application programming interface is an interface used to interact with the control end. It should be noted that the registration center 110 may further interact with the control end using a specified operation page. The specified operation page may be an HTML, page, for example, an HTML5 page. In this embodiment of this application, the registration center 110 obtains, through the second application programming interface or using the specified operation page, an application blueprint and a resource index that are provided by the control end, and the registration center 110 may further provide a correspondence between an application blueprint and a resource index to the deployment apparatus 120 through the first application programming interface.

It should be noted that the application blueprint, the resource index, the correspondence, and the like may all be manually orchestrated and input into the registration center.

Figure 2A:
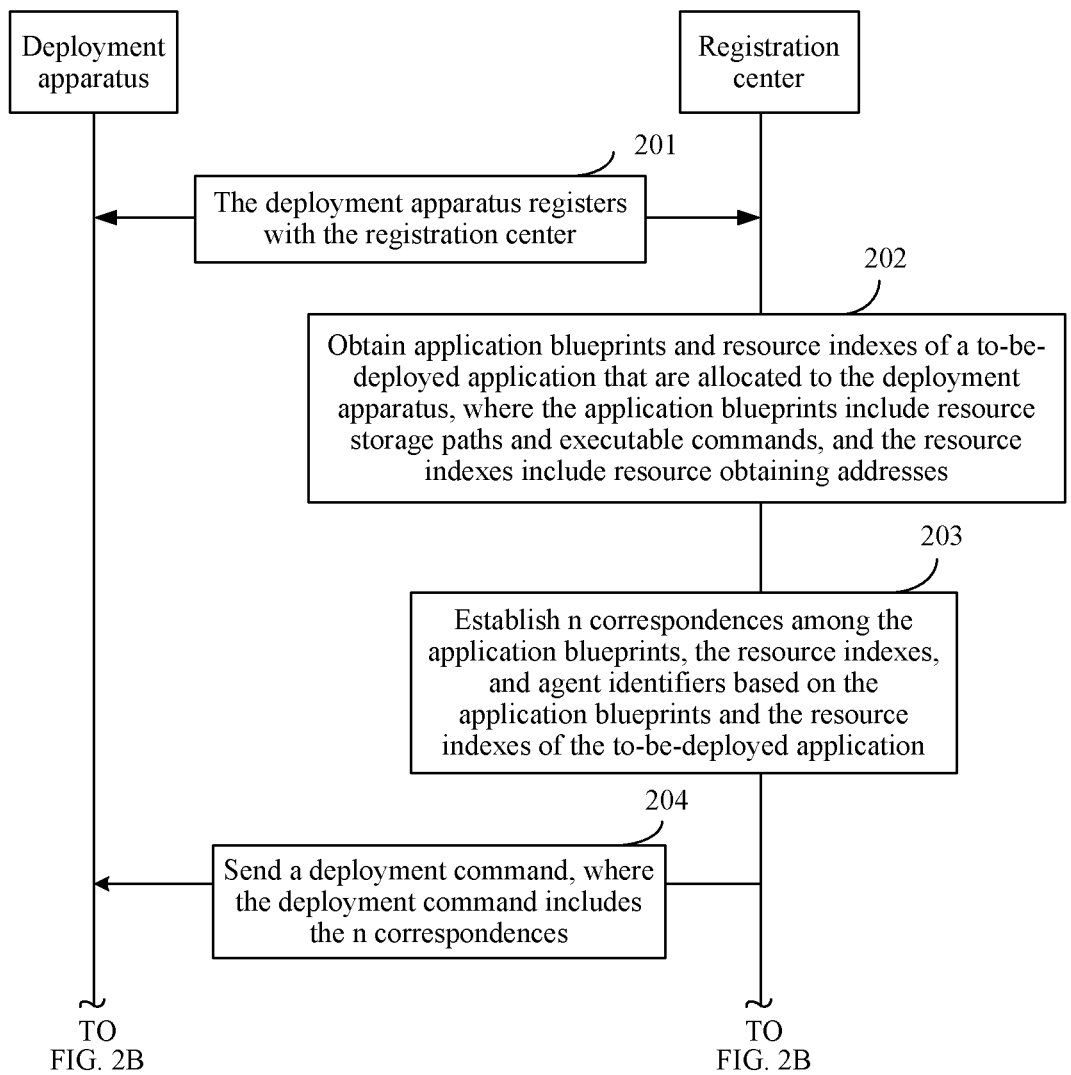
FIG. 2A and FIG. 2B are a flowchart of an application deployment method according to an embodiment of this application.
Figure 2B:
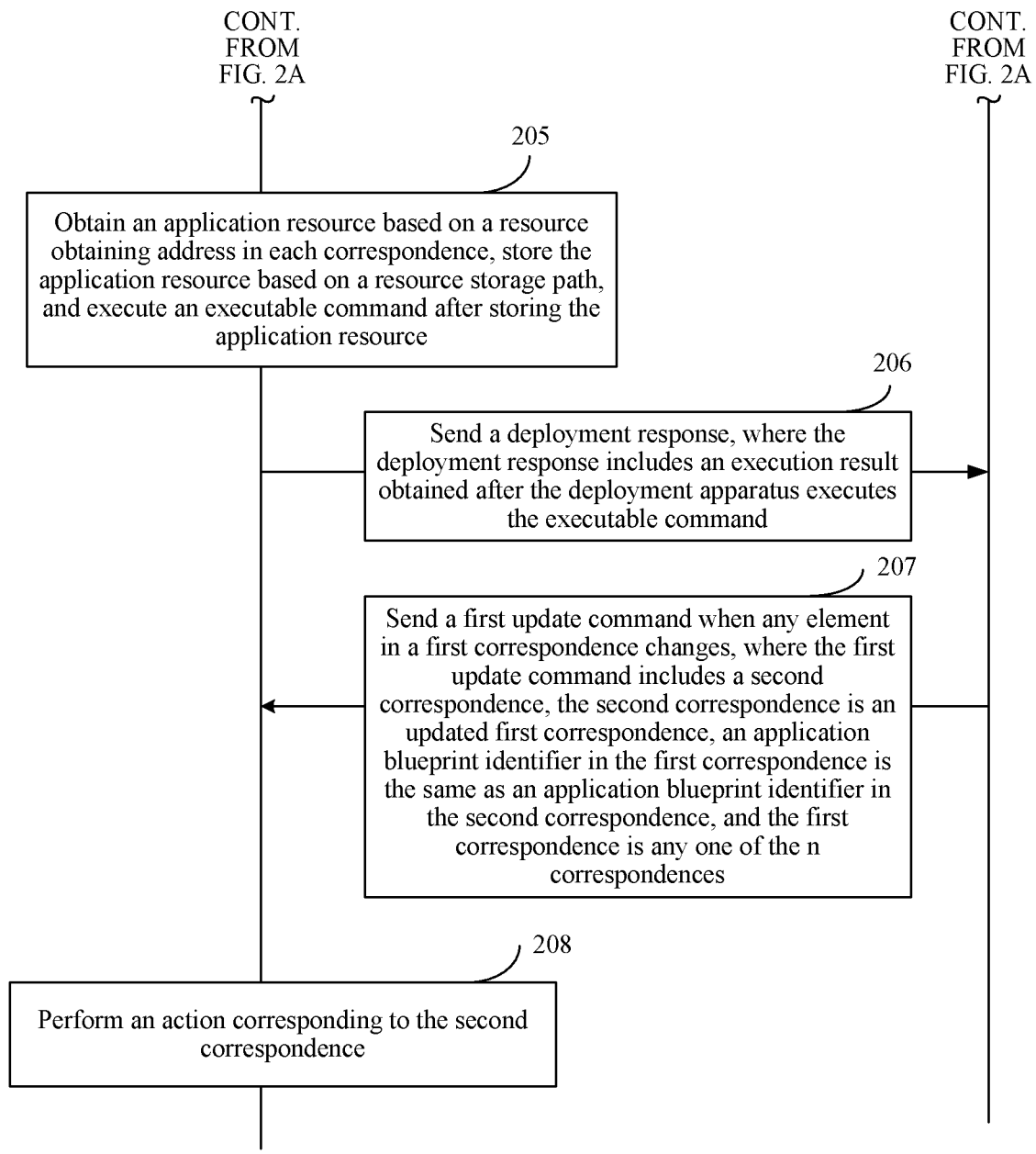

An embodiment of this application provides an application deployment method, and the application deployment method is applied to the application deployment system shown in FIG. 1A and FIG. 1B. It is assumed that an application blueprint includes an application blueprint identifier, a resource storage path, and an executable command, and a resource index includes a resource index identifier and a resource obtaining address. As shown in FIG. 2A and FIG. 2B, in this embodiment of this application, an example in which a registration center is a deployment apparatus for application deployment is used for description. For an application deployment process of another deployment apparatus, refer to the deployment apparatus. The application deployment method includes the following steps.

Step 201: The deployment apparatus registers with the registration center.

Figure 2C:
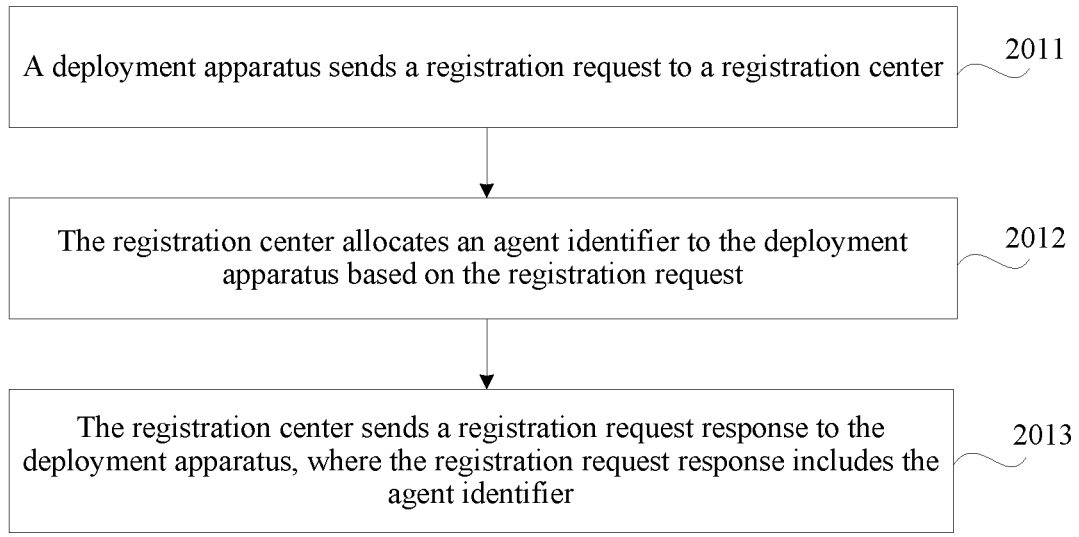
FIG. 2C is a flowchart of a registration process of a deployment apparatus according to an embodiment of this application.

In this embodiment of this application, each deployment apparatus needs to first register with the registration center such that the registration center performs a subsequent management and application deployment process. Optionally, as shown in FIG. 2C, a process in which the deployment apparatus registers with the registration center may include the following steps.

Step 2011: The deployment apparatus sends a registration request to the registration center.

After the deployment apparatus sends the registration request to the registration center, correspondingly, the registration center receives the registration request sent by the deployment apparatus.

Optionally, the deployment apparatus may first obtain configuration information. The configuration information includes information about a first application programming interface of the registration center. For example, the information about the first application programming interface may be an identifier of the first application programming interface. Then the deployment apparatus sends the registration request to the registration center through the first application programming interface of the registration center. Correspondingly, the registration center receives, through the first application programming interface, the registration request sent by the deployment apparatus. The first application programming interface is an interface provided by the registration center for communicating with the deployment apparatus. The configuration information may be preconfigured in agent software installed in the deployment apparatus, and after the deployment apparatus is powered on, the deployment apparatus may automatically obtain the configuration information from the agent software.

Step 2012: The registration center allocates an agent identifier (agent_id) to the deployment apparatus based on the registration request.

In an application, the registration request may carry a serial number used to identify the deployment apparatus, for example, an IP address or a Medium Access Control (MAC) address (the MAC address is also referred to as a physical address or a hardware address). The registration center identifies the deployment apparatus based on the serial number, and allocates, to the deployment apparatus, the agent identifier used to uniquely identify the deployment apparatus. It should be noted that the uniquely identifying means that the identifier can be used to uniquely identify one of a plurality of deployment apparatuses managed by the registration center, that is, the agent identifier in the application deployment system is not repeated. The agent identifier may be a string, for example, a combination of names, code, serial numbers, or preset characters (for example, numbers). For example, the agent identifier may be agent_001. Optionally, the registration request may further carry information, for example, a port number of the deployment apparatus.

The registration center may determine, based on the carried serial number of the deployment apparatus, an application environment in which the deployment apparatus is located. For example, the deployment apparatus is determined, based on the IP address of the deployment apparatus, as a deployment apparatus in a production environment.

Step 2013: The registration center sends a registration request response to the deployment apparatus, where the registration request response includes the agent identifier.

When the deployment apparatus receives the registration request response sent by the registration center, the registration process is completed. In an application, after receiving a registration request response, the deployment apparatus may further return, to the registration center, a piece of response information carrying an agent identifier, to notify the registration center that the deployment apparatus successfully receives the agent identifier. In this case, registration is completed. In this way, problems occurring during interaction between the registration center and the deployment apparatus can be reduced.

After the deployment apparatus completes registration with the registration center, the registration center can manage the deployment apparatus, and deploy a subsequent application resource.

Step 202: The registration center obtains application blueprints and resource indexes of a to-be-deployed application that are allocated to the deployment apparatus, where the application blueprints include resource storage paths and executable commands, and the resource indexes include resource obtaining addresses.

In different application environments, integrated to-be-deployed resources to be deployed (that is, all resources to be deployed) for the to-be-deployed application are different. For example, an application environment may include a development environment, a test environment, an integrated environment (acceptance testing environment), or a production environment. Integrated to-be-deployed resources of the to-be-deployed application in these application environments are different.

The development environment is used to develop a server environment, an isolation environment, or the like of an application, a configuration of the development environment matches a corresponding application to be developed, and the development environment is an integrated running environment of a development environment such as C, C++, JAVA, PYTHON, Web, or the like in a WINDOWS, LINUX, or IOS system. The test environment is an environment in which an application test is performed, and is a collective name of computer hardware, software, a network device, historical data, and the like that are required for completing the application test, and a configuration of the test environment is usually less than or equal to that of the production environment. The integrated environment is an environment in which different application systems are integrated to form a new system for testing, verification, emulation, and simulation. The production environment is an environment that formally provides an external service, and is an environment that is finally used when delivery is made to a customer. The production environment may be a real environment.

For example, each integrated to-be-deployed resource of the to-be-deployed application in the development environment and the test environment includes an application body and an application configuration file, an integrated to-be-deployed resource in the integrated environment includes an application body and a database resource, and an integrated to-be-deployed resource in the production environment includes an application body and a load balancing resource. In addition, an integrated to-be-deployed resource of the to-be-deployed application may be deployed in at least one target deployment apparatus, and quantities of target deployment apparatuses are different depending on different actual deployment scenarios and application environments.

Optionally, assuming that the deployment apparatus in step 201 is an apparatus in a specified application environment (the specified application environment is an application environment in which the to-be-deployed application currently needs to be deployed), a process of obtaining the application blueprints and the resource indexes of the to-be-deployed application that are allocated to the deployment apparatus may include the following steps.

Step A: Receive m resource indexes of the to-be-deployed application, where application resources corresponding to the m resource indexes constitute an integrated to-be-deployed resource of the to-be-deployed application in the specified application environment, and m is an integer greater than or equal to 1.

For example, if the specified application environment is the integrated environment, the to-be-deployed application is XXapp, and the integrated to-be-deployed resource includes an application body XXapp.war and an application configuration file application.properties, two resource indexes may be set. A resource obtaining address in the first resource index is 1.100.132.116/repository/XXapp/AT/latest/XXapp.war, and is used to indicate an obtaining address of the application body XXapp.war. A resource obtaining address in the second resource index is 1.100.132.116/repository/XXapp/AT/latest/config/application.properties, and is used to indicate an obtaining address of the application configuration file application.properties.

Step B: Receive p application blueprints of the to-be-deployed application, where storage paths of the p application blueprints correspond to the m resource indexes.

Resource storage paths of the p application blueprints are used to store resources obtained using the m resource indexes, and m and p may be equal or may be different. For example, resources that are obtained using one or more resource indexes and that are in the resources obtained using the m resource indexes may be stored based on a resource storage path of one application blueprint.

For example, the example in step A is still used, a resource storage path in an application blueprint corresponding to the application body XXapp.war obtained based on the resource obtaining address in the first resource index is /at/tomcat/webapps/, and a resource storage path in an application blueprint corresponding to the application configuration file application.properties obtained based on the resource obtaining address of the second resource index is /at/tomcat/webapps/XXapp/resources/.

In actual implementation, in step A and step B, a manner of receiving the application blueprints and the resource indexes by the registration center is as follows.

A control end (a person or a third-party system) directly inputs, from a background to the registration center, the application blueprints and the resource indexes that are allocated to the deployment apparatus. Correspondingly, the registration center obtains the application blueprints and the resource indexes.

The registration center may provide a second application programming interface, where the second application programming interface is an interface used by the registration center to communicate with the control end in the background. Therefore, the registration center may obtain the application blueprints of the to-be-deployed application through the second application programming interface, and may also obtain the resource indexes of the to-be-deployed application through the second application programming interface.

In addition, the registration center may provide a specified operation page, and the specified operation page is a page used by the control end to input information to the registration center, and may be a network operation page, that is, a web page, or may be an operation page of a client. This is not limited in this embodiment of this application. Therefore, the registration center may obtain the application blueprints of the to-be-deployed application using the specified operation page, and may also obtain the resource indexes of the to-be-deployed application using the specified operation page.

Step C: After a subscription instruction of the deployment apparatus is received, obtain at least one of the m resource indexes as a resource index that is of the to-be-deployed application and that is allocated to the deployment apparatus, and obtain the p application blueprints as application blueprints of the to-be-deployed application that are allocated to the deployment apparatus.

In this embodiment of this application, the subscription instruction is used to subscribe to an application in the registration center, and the subscription instruction may be triggered by the deployment apparatus or the control end. When the subscription instruction is triggered by the deployment apparatus, in step 201, the deployment apparatus may usually add the subscription instruction to the registration request, and the subscription instruction indicates an application that needs to be subscribed to. When an integrated to-be-deployed resource of the subscribed application exists in the registration center (during an application, when the deployment apparatus performs registration, the registration center may have not prepared a corresponding resource), the registration center may allocate the resource indexes and the application blueprints to the deployment apparatus, to subsequently perform application deployment. When the subscription instruction is triggered by the control end, the control end may trigger the subscription instruction through the second application programming interface or using the specified operation page. For example, when an application needs to be deployed in the test environment, the control end triggers the subscription instruction, and the registration center may allocate the resource indexes and the application blueprints to the deployment apparatus in the test environment, to subsequently perform application deployment in the test environment.

Optionally, because integrated to-be-deployed resources may be deployed in one or more target deployment apparatuses based on different deployment scenarios and/or application environments, step C may include determining, by the registration center, at least one target deployment apparatus used to deploy an integrated to-be-deployed resource in the specified application environment, where the at least one target deployment apparatus includes the deployment apparatus in step 201, allocating a resource index of the m resource indexes to each target deployment apparatus, and allocating an application blueprint of the p application blueprints to each target deployment apparatus. Because the deployment apparatus in step 201 belongs to the at least one target deployment apparatus, the registration center also determines the resource index and the application blueprint that are allocated to the deployment apparatus.

Step 203: The registration center establishes n correspondences among the application blueprints, the resource indexes, and agent identifiers based on the application blueprints and the resource indexes of the to-be-deployed application.

After the registration center obtains the application blueprints and the resource indexes that are allocated to the deployment apparatus, and the agent identifiers of the deployment apparatus, the correspondences among the application blueprints, the resource indexes, and the agent identifiers may be established. In an application, a process of establishing the foregoing correspondences is performed by the control end (a person or a third-party system) by controlling the registration center. The control end may directly input the established correspondences through the second application programming interface or using the specified operation page. That is, the registration center simultaneously performs steps 202 and 203. Obtaining the correspondence is completing the process of obtaining the application blueprints, the resource indexes, and the agent identifiers and establishing the correspondences. In addition, after the registration center obtains the application blueprints, the resource indexes, and the agent identifiers, the control end may also control, using the specified operation page, the registration center to generate the corresponding correspondences. For example, the registration center displays, on the specified operation page, the application blueprints, the resource indexes, and the agent identifiers that are obtained by the registration center, and then the control end controls, through a dragging operation, a click operation, a double-click operation, and/or the like, the registration center to establish the n correspondences.

For example, a format of a finally established correspondence may be blueprint_id:index_id:agent_id or blueprint_id-index_id-agent_id.

Step 204: The registration center sends a deployment command to the deployment apparatus, where the deployment command includes the n correspondences.

Optionally, the registration center sends the deployment command to the deployment apparatus through the first application programming interface. The deployment command is used to instruct the deployment apparatus to obtain an application resource based on a resource obtaining address in each correspondence, store the application resource based on a resource storage path, and execute an executable command after storing the application resource.

Step 205: The deployment apparatus obtains the application resource based on the resource obtaining address in each correspondence, stores the application resource based on the resource storage path, and executes the executable command after storing the application resource.

After the deployment apparatus receives the deployment command sent by the registration center, where the deployment command may include the n correspondences among the application blueprints, the resource indexes, and the agent identifiers, the registration center may obtain the application resource based on the resource obtaining address in each correspondence, store the application resource based on the resource storage path, and execute the executable command after storing the application resource.

For example, it is assumed that the deployment command carries a correspondence, an identifier of the deployment apparatus is agent_001, an application resource is an appX002 (that is, a second version of appX) installation package, a corresponding application blueprint identifier is appXblueprint_001, a resource index identifier is index_001, an application blueprint is appXblueprint_001: C:\Program Files\appX:Install_cmd&run_cmd, where Install_cmd represents an installation command, and run_cmd represents a running command, and a resource index is index_001:http:/appX.com/. The correspondence carried in the deployment command may be appXblueprint_001:index_001:agent_001, a resource obtaining address is "http:/appX.com/", a resource storage path is "C:\Program Files\appX", and an executable command is an installation command and a running command. The deployment apparatus obtains the appX002 installation package using "http:/appX.com/", stores the appX002 installation package in the folder "C:\Program Files\appX", and executes the installation command and the running command on the appX002 installation package after storage is completed.

Step 206: The deployment apparatus sends a deployment response to the registration center, where the deployment response includes an execution result obtained after the deployment apparatus executes the executable command.

Optionally, after completing execution of an executable command in a correspondence each time, the deployment apparatus may feedback a corresponding execution result to the registration center using a deployment response. Alternatively, after completing execution of executable commands in a plurality of correspondences, the deployment apparatus feeds back execution results of the plurality of sets of executable commands to the registration center using a same deployment response. Correspondingly, after receiving the deployment response, the registration center may determine a subsequent operation based on the execution results carried in the deployment response. In this way, problems occurring during interaction between the registration center and the deployment apparatus can be reduced.

For example, the execution result may include a feedback status identifier and feedback status information. The feedback status identifier is used to indicate a command execution success or a command execution failure. For example, a feedback status may be 0 or 1, where 0 represents a command execution success, and 1 represents a command execution failure. The feedback status information is used to carry a cause of the failure when execution of the executable command fails. When the executable command is successfully executed, the feedback status information is null. For example, when the feedback status is 1, the feedback status information includes a permission error, a resource obtaining address error, a response timeout, and other content. The registration center may correspondingly perform manual intervention when execution of the executable command fails. For example, when the feedback status information includes the permission error, a permission of the deployment apparatus is modified. When the feedback status information includes the resource obtaining address error, a resource obtaining address is modified. When the feedback status information includes the response timeout, a cause of the response timeout of the deployment apparatus is queried, and corresponding processing is performed.

Step 207: The registration center sends a first update command to the deployment apparatus when any element in a first correspondence changes, where the first update command includes a second correspondence, the second correspondence is an updated first correspondence, an application blueprint identifier in the first correspondence is the same as an application blueprint identifier in the second correspondence, and the first correspondence is any one of the n correspondences.

In an implementation, because of different deployment scenarios and/or a change in an application environment (for example, upgrade or rollback of the application environment), some elements in the n correspondences may change. Correspondingly, the registration center sends an update command to the deployment apparatus.

In this embodiment of this application, an application blueprint identifier may correspond to a type of application resource stored in a resource server, and a change in an element in the first correspondence other than the application blueprint identifier may be considered as an update of the first correspondence. Certainly, when an application blueprint identifier in a correspondence in the registration center changes, it may be considered that a correspondence is newly established. For a use process of the correspondence, refer to step 204 to step 205.

Step 208: The deployment apparatus performs an action corresponding to the second correspondence.

In this embodiment of this application, there may be a plurality of manners in which the deployment apparatus performs the action corresponding to the second correspondence. The following two manners are used as an example for description in this embodiment of this application.

In a first manner, the deployment apparatus completely performs the action corresponding to the second correspondence.

For example, the deployment apparatus may obtain an application resource based on a resource obtaining address in the second correspondence, store the application resource based on a resource storage path in the second correspondence, and executes an executable command in the second correspondence. For a process thereof, refer to step 205.

In a second manner, the deployment apparatus performs an action corresponding to a target element that changes in the second correspondence.

First, the deployment apparatus detects the target element that changes in the second correspondence.

Because the deployment apparatus obtains the first correspondence in step 204, after receiving the first update command sent by the registration center, the deployment apparatus may first compare an application blueprint identifier in a correspondence carried in the first update command and an application blueprint identifier of a currently stored correspondence. If the application blueprint identifiers of the two correspondences are the same, it indicates that the currently stored correspondence is the first correspondence, and the correspondence carried in the first update command is the second correspondence, that is, the second correspondence is the updated first correspondence. Then an element that changes in the second correspondence is detected based on the first correspondence, and the element is determined as the target element. Further, the deployment apparatus compares the first correspondence and the second correspondence, and determines a different element in the two correspondences as the target element.

Then the deployment apparatus performs, based on the second correspondence, the action corresponding to the target element.

In this embodiment of this application, the target element updated in the second correspondence is different from a target element updated in the first correspondence, and actions executed by the deployment apparatus are different. The following two implementable manners are used as an example for description in this embodiment of this application.

In a first implementable manner, when the target element includes a resource obtaining address and/or a resource storage path, the deployment apparatus obtains an application resource based on the resource obtaining address in the second correspondence, and executes the executable command in the second correspondence after storing the application resource based on the resource storage path in the second correspondence. For example, referring to the example in step 205, the second correspondence is appXblueprint_001:index_002:agent_001, an application blueprint is appXblueprint_001:D:\Program Files\appX: Install_cmd&run_cmd, and a resource index is index_002: http:/appX2.com/. Therefore, compared with the first correspondence, an element that changes in the second correspondence is a resource obtaining address "http:/ appX2.com/" and a resource storage path "D:\Program Files\appX". In this case, the deployment apparatus obtains the appX002 installation package again using "http:/ appX2.com/", stores the appX002 installation package in a folder "D:\Program Files\appX", and executes the installation command and the running command on the appX002 installation package after storage is completed.

In a second implementable manner, when the target element includes an executable command, the deployment apparatus executes the executable command in the second correspondence.

For example, referring to the example in step 205, the second correspondence is appXblueprint_001:index_001: agent_001, an application blueprint is appXblueprint_001: C:\Program Files\appX:update_cmd, and a resource index is index_001:http:/appX.com/, where "update_cmd" is an update command. Therefore, compared with the first correspondence, an element that changes in the second correspondence is the executable command "update_cmd", and the deployment apparatus needs to execute only the update command on the appX002 installation package.

The actions executed in the first implementable manner and the second implementable manner are less than actions performed when the action corresponding to the second correspondence is directly performed in the first manner, and efficiency is relatively high.

In this embodiment of this application, application resource update includes a plurality of scenarios, such as application upgrade, application resource rollback, and configuration file update. The application upgrade and the application resource rollback are used as an example for description in this embodiment of this application.

The application upgrade may be implemented in the first implementable manner in the first manner and the second manner. For a same type of application resource, the application upgrade is a process in which a low-version application resource is replaced with a high-version application resource.

Further, when the application upgrade needs to be performed, the control end may update an application blueprint and/or a resource index in the first correspondence for an updated application resource in the resource server (a version of the application resource is higher than a version of a to-be-updated application resource), to obtain the second correspondence, and then perform the action corresponding to the second correspondence in the first implementable manner in the first manner or the second manner.

For example, still referring to the example in step 205, it is assumed that the updated application resource is an appX003 (that is, a third version of appX) installation package. Optionally, the control end may replace the application resource appX002 installation package corresponding to the resource obtaining address "http:/appX.com/" with the appX003 installation package, and then update the resource storage path in the application blueprint from "C:\Program Files\appX" to "D:\Program Files\appX", to obtain the second correspondence. After the deployment apparatus obtains the second correspondence, the deployment apparatus obtains the appX003 installation package using "http:/appX.com/", stores the appX003 installation package in the folder "D:\Program Files\appX", and executes the installation command and the running command on the appX003 installation package after storage is completed, to upgrade an appX application.

Optionally, the control end may alternatively update the resource obtaining address "http:/appX.com/" in the resource index to "http:/appX3.com/", where a corresponding application resource is an appX003 installation package, and then update the resource storage path "C:\Program Files\appX" in the application blueprint to "D:\Program Files\appX", to obtain the second correspondence. After obtaining the second correspondence, the deployment apparatus obtains the appX003 installation package using "http:/appX3.com/", stores the appX003 installation package in the folder "D:\Program Files\appX", and executes the installation command and the running command on the appX003 installation package after storage is completed, to upgrade an appX application.

Optionally, the control end may alternatively update the resource obtaining address "http:/appX.com/" in the resource index to "http:/appX3.com/", to obtain the second correspondence. After the deployment apparatus obtains the second correspondence, the deployment apparatus obtains an appX003 installation package using "http:/appX3.com/", stores the appX003 installation package in a folder "C:\Program Files\appX", and executes the installation command and the running command on the appX003 installation package after storage is completed, to upgrade an appX application.

The application resource rollback may be further implemented in the first implementable manner in the first manner and the second manner, and the application resource rollback is a process of rolling back a storage status of an application resource to a previous storage status.

Further, when the application resource rollback needs to be performed, the control end may update an application blueprint and/or a resource index in the first correspondence for an updated application resource, to obtain the second correspondence, and then perform the action corresponding to the second correspondence in the first implementable manner in the first manner or the second manner.

For example, still referring to the example in step 205, it is assumed that the rolled-back application resource is an appX001 (that is, a first version of appX) installation package. Optionally, the control end may replace the application resource appX002 installation package corresponding to the resource obtaining address "http:/appX.com/" with the appX001 installation package, and then update the resource storage path in the application blueprint from "C:\Program Files\appX" to "D:\Program Files\appX", to obtain the second correspondence. After the deployment apparatus obtains the second correspondence, the deployment apparatus obtains the appX001 installation package using "http:/appX.com/", stores the appX001 installation package in the folder "D:\Program Files\appX", and executes the installation command and the running command on the appX001 installation package after storage is completed, to roll back an appX application.

Optionally, the control end may alternatively update the resource obtaining address "http:/appX.com/" in the resource index to "http:/appX1.com/", update the corresponding application resource to an appX001 installation package, and then update the resource storage path "C:\Program Files\appX" in the application blueprint to "D:\Program Files\appX", to obtain the second correspondence. After obtaining the second correspondence, the deployment apparatus obtains the appX001 installation package using "http:/appX1.com/", stores the appX001 installation package in the folder "D:\Program Files\appX", and executes the installation command and the running command on the appX001 installation package after storage is completed, to roll back an appX application.

Optionally, the control end may alternatively update the resource obtaining address "http:/appX.com/" in the resource index to "http:/appX1.com/", to obtain the second correspondence. After obtaining the second correspondence, the deployment apparatus obtains an appX001 installation package using "http:/appX1.com/", stores the appX001 installation package in a folder "C:\Program Files\appX", and executes the installation command and the running command on the appX001 installation package after storage is completed, to roll back an appX application.

It should be noted that when the target element includes a resource storage path, the deployment apparatus may perform a corresponding action in the first implementable manner, or may perform a corresponding action in the following third implementable manner.

In the third implementable manner, when the target element includes the resource storage path, the deployment apparatus obtains a locally stored application resource based on a first resource storage path in the first correspondence, and stores the application resource again based on a second resource storage path in the second correspondence, then the deployment apparatus replaces the locally stored first correspondence with the second correspondence, that is, overwrites the first correspondence using the second correspondence. For example, referring to the example in step 205, the second correspondence is appXblueprint_001:index_001: agent_001, an application blueprint is appXblueprint_001: D:\Program Files\appX:Install_cmd&run_cmd, and a resource index is index_001:http:/appX.com/. Compared with the first correspondence, an element that changes in the second correspondence is a resource storage path "D:\Program Files\appX". In this case, the first resource storage path is "C:\Program Files\appX", the second resource storage path is "D:\Program Files\appX", and the deployment apparatus may obtain an appX002 installation package using "C:\Program Files\appX", store the appX002 installation package in a folder "D:\Program Files\appX", and replace the first correspondence with the second correspondence.

The actions executed in the third implementable manner are less than the actions executed in the first implementable manner, and efficiency is relatively high.

Further, after the second correspondence is replaced with the first correspondence in the third implementable manner, an application resource downloaded based on the first correspondence may be deleted. For example, in step 205, the appX002 installation package is stored in "C:\Program Files\appX" based on the first correspondence. After the appX002 installation package is stored in "D:\Program Files\appX" in the third implementable manner, the appX002 installation package stored in "C:\Program Files\appX" is deleted.

However, if the application resource downloaded based on the first correspondence is reserved, quick resource rollback may be further implemented in a subsequent process. The quick resource rollback process may have the following two implementations.

In a first implementation, the quick rollback process includes the following steps.

Step A1: The deployment apparatus records a correspondence between the first resource storage path and the second resource storage path after obtaining the locally stored application resource based on the first resource storage path in the first correspondence, and storing the application resource again based on the second resource storage path in the second correspondence.

For example, the first resource storage path is C:\Program Files\appX, the second resource storage path is D:\Program Files\appX, and the correspondingly recorded correspondence between the first resource storage path and the second resource storage path is C:\Program Files\appX-D:\Program Files\appX. Certainly, the correspondence may alternatively be recorded in another manner. This is not limited in this embodiment of this application.

Step A2: The deployment apparatus receives a rollback instruction sent by the registration center, where the rollback instruction is used to instruct to roll back a storage status of an application resource to a previous storage status.

In this embodiment of this application, when quick rollback needs to be performed, the control end may trigger the registration center to create the rollback instruction, and the rollback instruction is used to instruct to roll back a storage status of an application resource to a previous storage status. The rollback instruction is an instruction generated when only the resource storage path changes in the foregoing correspondence.

Step A3: The deployment apparatus obtains the second resource storage path from the currently stored second correspondence.

Step A4: The deployment apparatus obtains the first resource storage path based on the correspondence between the first resource storage path and the second resource storage path.

Step A5: The deployment apparatus updates the second resource storage path in the currently stored second correspondence to the first resource storage path.

For example, the first correspondence may be appXblueprint_001:index_001:agent_001, a resource obtaining address is "http:/appX.com/", a resource storage path is "C:\Program Files\appX", and an executable command is an installation command and a running command. After receiving the rollback instruction, the deployment apparatus obtains a second resource storage path "D:\Program Files\appX" from the second correspondence, queries a correspondence C:\Program Files\appX-D:\Program Files\appX between a first resource storage path and the second resource storage path, to obtain the first resource storage path "C:\Program Files\appX", and then updates the second resource storage path in the second correspondence to the first resource storage path, to obtain the first correspondence appXblueprint_001:index_001:agent_001, an application blueprint appXblueprint_001:D:\Program Files\appX:Install_cmd& run_cmd, and a resource index index_001:http:/appX.com/.

In a second implementation, the quick rollback process includes the following steps.

Step B1: The deployment apparatus records a correspondence between the first resource storage path and the second resource storage path after obtaining the locally stored application resource based on the first resource storage path in the first correspondence, and storing the application resource again based on the second resource storage path in the second correspondence.

For step B1, refer to step A1. Details are not described again in this embodiment of this application.

Step B2: The deployment apparatus receives a second update command sent by the registration center, where the second update command is a command sent by the registration center to the deployment apparatus after the registration center detects that any element in the second correspondence changes, the update command includes a third correspondence, the third correspondence is an updated second correspondence, and an application blueprint identifier in the second correspondence is the same as an application blueprint identifier in the third correspondence.

For step B2, refer to step 207. Details are not described again in this embodiment of this application.

Step B3: When only resource storage paths in the third correspondence and the second correspondence are different, and the resource storage path in the third correspondence is the same as the first resource storage path recorded in the correspondence, update the second resource storage path in the second correspondence to the first resource storage path.

Because the deployment apparatus obtains the second correspondence in step 207, after receiving the second update command sent by the registration center, the deployment apparatus may detect, based on the second correspondence, an element that changes in the third correspondence. For the detection process, refer to the second manner provided in step 208. Further, the deployment apparatus may first compare an application blueprint identifier in a correspondence carried in the second update command and an application blueprint identifier of a currently stored correspondence. If the application blueprint identifiers of the two correspondences are the same, it indicates that the currently stored correspondence is the second correspondence, and the correspondence carried in the second update command is the third correspondence, that is, the third correspondence is the updated second correspondence. Then the element that changes in the third correspondence is detected based on the second correspondence, and the element is determined as the target element. Further, the deployment apparatus compares the second correspondence and the third correspondence, and determines a different element in the two correspondences as the target element. When only the resource storage paths in the third correspondence and the second correspondence are different, and the resource storage path in the third correspondence is the same as the first resource storage path recorded in the correspondence, the second resource storage path in the second correspondence is updated to the first resource storage path. For the path update process, refer to steps A3 to A5.

When only the resource storage paths in the third correspondence and the second correspondence are different, and the resource storage path in the third correspondence is different from the first resource storage path recorded in the correspondence, an action corresponding to the third correspondence may be performed in the first implementable manner in the first manner and the second manner. Details are not described again in this embodiment of this application.

In conclusion, according to the application deployment method provided in this embodiment of this application, because the application blueprints and the resource indexes have simple formats, a correspondence required during application deployment can be quickly written with only simple basic knowledge, and there is no need to write a complex task script, thereby reducing an orchestration requirement. Therefore, application deployment complexity is reduced, and application deployment efficiency is increased.

In a related technology, because deployment procedures are different in different application environments (for example, a development environment, a test environment, an integrated environment, or a production environment), technical personnel need to develop different task scripts to adapt to the different application environments. For example, for a same application, the technical personnel need to provide two task scripts one for the development environment and the other for the test environment. Consequently, application deployment complexity is relatively high, and deployment efficiency is relatively low.

However, according to the application deployment method in this embodiment of this application, because the registration center may establish the correspondences among the application blueprints, the resource indexes, and the agent identifiers, the execution deployment apparatus may obtain and store an application resource based on the correspondence, execute an executable command, and deploy the application resource. Because the application blueprints and the resource indexes have simple formats, the correspondence required during application deployment can be quickly written with only simple basic knowledge. There is no need to develop different task scripts in different application environments, and environment adaptation can be implemented provided that a correspondence is established or adjusted. Therefore, application deployment complexity is effectively reduced, and deployment efficiency is increased.

For ease of understanding, an example in which a to-be-deployed application is XXapp is used for description in this embodiment of this application. It is assumed that an integrated to-be-deployed resource of the to-be-deployed application includes an application body, a database resource, and a load balancing resource, and an address of the registration center is register.deploysystem.internal:8080. Referring to step 201, the deployment apparatus may register with the registration center based on the address of the registration center. It is assumed that the to-be-deployed application XXapp needs to be deployed in four application environments: a development environment, a test environment, an integrated environment, and a production environment. In this case, in different application environments, different correspondences required during deployment may be established for a same to-be-deployed application. As shown in Table 1, an application blueprint includes three parts: an application blueprint identifier blueprint_id, a resource storage path resource_path, and an executable command refresh_cmd. A resource index includes two parts: a resource index identifier Index id and a resource obtaining address Resource_uri.

The development environment is used as an example. Referring to Table 1, in the development environment, the to-be-deployed application XXapp needs to be deployed on one deployment apparatus, an agent identifier (agent-id) of the deployment apparatus is Agent-01, and an integrated to-be-deployed resource of the to-be-deployed application XXapp includes a compressed package app.war and an application configuration file app.config. Two correspondences need to be allocated for the deployment apparatus Agent-01. Referring to the format of the correspondence in step 203, the two correspondences may be respectively Agent-01-XXApp.app.war-XXApp.app.war and Agent-01-XXApp.app.application.properties-XXApp.app.config.

In the correspondence Agent-01-XXApp.app.war-XXApp.app.war, an application blueprint XXApp.app.war includes XXApp.app.war-/dev/tomcat/webapps/-/dev/tomcat/bin/restart.sh, and a resource index XXApp.app.war includes XXApp.app.war-1.100.132.116/repository/XXapp/a100150/build99/XXapp.war.

In the correspondence Agent-01-XXApp.app.application.properties-XXApp.app.config, an application blueprint XXApp.app.application.properties includes XXApp.app.application.properties-/dev/tomcat/webapps/XXapp/resources/-/dev/tomcat/bin/restart.sh, and a resource index XXApp.app.config includes XXApp.app.config-1.100.132.116/repository/XXapp/a100150/build56/config/application.properties. For a correspondence to be allocated in another application environment in Table 1, refer to the descriptions of the correspondences to be allocated in the foregoing development environment. Details are not described again in this embodiment of this application.

It should be noted that, in the development environment and the test environment, attention is usually paid only to an update of an application body. In this case, referring to Table 1, a deployment apparatus agent01 exists in the development environment, and the integrated to-be-deployed resource of the to-be-deployed application XXapp includes the compressed package app.war and the application configuration file app.config. After the compressed package XXapp.war is deployed in the deployment apparatus agent01, if the compressed package needs to be updated, referring to steps 207 and 208, the control end can update a compressed package on a path /dev/tomcat/webapps/ by modifying only resource_uri in a resource index XXApp.app.war corresponding to an application blueprint XXApp.app.war, and then can enable an XXapp service by executing corresponding refresh_cmd.

A deployment apparatus agent02 exists in the test environment, and the integrated to-be-deployed resource of the to-be-deployed application XXapp includes the compressed package app.war and the application configuration file app.config. After the compressed package XXapp.war is deployed in the deployment apparatus agent02, if the compressed package needs to be updated, referring to steps 207 and 208, the control end can update a compressed package on a path /test/tomcat/webapps/ by modifying only resource_uri in a resource index XXApp.app.war corresponding to an application blueprint XXApp.app.war, and then can enable an XXapp service by executing corresponding refresh_cmd.

In the integrated environment and the production environment, in addition to attention paid to update of an application body, attention may be further paid to update of a database resource or a load balancing resource. In this case, referring to Table 1, two deployment apparatuses agent03 and agent04 exist in the integrated environment, the integrated to-be-deployed resource of the to-be-deployed application XXapp includes the compressed package app.war and the application configuration file app.config that need to be deployed in the deployment apparatus agent03, and the database resource db.binary and the load balancing resource db.config that need to be deployed in the deployment apparatus agent04. After the compressed package XXapp.war is deployed in the deployment apparatus agent03, if the compressed package needs to be updated, referring to steps 207 and 208, the control end can update a compressed package on a path /at/tomcat/webapps/ by modifying only resource_uri in a resource index XXApp.app.war corresponding to an application blueprint XXApp.app.war, and then can enable an XXapp service by executing corresponding refresh_cmd. After the database resource db.binary is deployed in the deployment apparatus agent04, if the database resource needs to be updated, referring to steps 207 and 208, the control end can update a database resource on a path /at/db/mysql/ by modifying only resource_uri in a resource index XXApp.app.db.binary corresponding to an application blueprint XXApp_db.binary, and then can silently install the database resource by executing corresponding refresh_cmd.

agent06, and a load balancing resource lb.config that needs to be deployed in the deployment apparatus agent07. After the load balancing resource lb.config is deployed in the deployment apparatus agent07, if the load balancing resource needs to be updated, referring to steps 207 and 208, the control end can update a database resource on a path /prod/lb/nginx/conf/ by modifying only resource_uri in a resource index XXApp.app.lb.config corresponding to an application blueprint XXApp_lb.config, and then can silently install the load balancing resource by executing corresponding refresh_cmd.

It should be noted that the foregoing update processes are merely examples of descriptions. In actual application, a configuration file may be further updated. For example, if an application configuration file is updated, the application configuration file can be loaded again using resource_uri in a resource index corresponding to an application blueprint. Details are not described again in this embodiment of this application.

TABLE 1

| Application environment | Agent id | Blueprint | | | Index | |
|---|---|---|---|---|---|---|
| | | Blueprint_id | Resource_path | Refresh_cmd | Index_id | Resource_uri |
| Development | Agent-01 | XXApp.app.war | /dev/tomcat/webapps/ | /dev/tomcat/bin/restart.sh | XXApp.app.war | 1.100.132.116/repository/XXapp/a100150/build99/XXapp.war |
| | | XXApp.app.application.properties | /dev/tomcat/webapps/XXapp/resources/ | /dev/tomcat/bin/restart.sh | XXApp.app.config | 1.100.132.116/repository/XXapp/a100150/build56/config/application.properties |
| Test | Agent-02 | XXApp.app.war | /test/tomcat/webapps/ | /test/tomcat/bin/restart.sh | XXApp.app.war | 1.100.132.116/repository/XXapp/QA/build101/XXapp.war |
| | | XXApp.app.application.properties | /test/tomcat/webapps/XXapp/resources/ | /opt/tomcat/bin/restart.sh | XXApp.app.config | 1.100.132.116/repository/XXapp/QA/build68/config/application.properties |
| Integration | Agent-03 | XXApp_app.war | /at/tomcat/webapps/ | /at/tomcat/bin/restart.sh | XXApp.app.war | 1.100.132.116/repository/XXapp/AT/latest/XXapp.war |
| | | XXApp_app.application.properties | /at/tomcat/webapps/XXapp/resources/ | /at/tomcat/bin/restart.sh | XXApp.app.config | 1.100.132.116/repository/XXapp/AT/latest/config/application.properties |
| | Agent-04 | XXApp_db.binary | /at/db/mysql/ | sh mysql-5.6.35.bin install--silent | XXApp.app.db.binary | 1.100.132.117/repository/mysql/5.6.35/bin/mysql-5.6.35.bin |
| | | XXApp_db.config | /at/db/mysql/conf/ | service mysqld reload | XXApp.app.db.config | 1.100.132.117/repository/mysql/5.6.35/conf/my-default.ini |
| Production | Agent-05 | XXApp_app.war | /prod/tomcat/webapps/ | /at/tomcat/bin/restart.sh | XXApp.app.war | internal.software.artifacts.repo/XXapp/1.0.0/XXapp.war |
| | | XXApp_app.application.properties | /prod/tomcat/webapps/XXapp/resources/ | /at/tomcat/bin/restart.sh | XXApp.app.config | internal.software.artifacts.repo/XXapp/1.0.0/config/application.properties |
| | Agent-06 | XXApp_db.binary | /prod/db/mysql/ | sh mysql-5.6.35.bin install--silent | XXApp.app.db.binary | internal.software.artifacts.repo/mysql/5.6.35/bin/mysql-5.6.35.bin |
| | | XXApp_db.config | /prod/db/mysql/conf/ | service mysqld reload | XXApp.app.db.config | configcenter.repo/mysql/5.6.35/conf/XXapp/my-default.ini |
| | Agent-07 | XXApp_lb.config | /prod/lb/nginx/conf/ | service nginx reload | XXApp.app.lb.config | configcenter.repo/ngxin/1.8.1/configs/XXapp/nginx.conf |

Three deployment apparatuses agent05, agent06, and agent07 exist in the production environment, and the integrated to-be-deployed resource of the to-be-deployed application XXapp includes the compressed package app.war and the application configuration file app.config that need to be deployed in the deployment apparatus agent05, a database resource db.binary and a database configuration file db.config that need to be deployed in the deployment apparatus It can be learned based on the foregoing examples that, according to the application deployment method provided in this embodiment of this application, there is no need to develop different task scripts in different application environments, environment adaptation can be implemented provided that a correspondence is established or adjusted, and correspondences in different environments may be reused or mutually referenced. For example, the correspondence allocated to the deployment apparatus Agent-02 in the test environment in Table 1 may be set with reference to the correspondence allocated to the deployment apparatus Agent-01 in the development environment. The correspondences in the two environments may be mutually referenced or simply modified. Therefore, application deployment complexity is effectively reduced, and deployment efficiency is increased.

In a conventional procedure-oriented application deployment method, because a corresponding task script needs to be written for each action in an application deployment process, a script writing period is relatively long, especially for script writing during which a process such as copying, transmission, downloading, decompression, or installation is performed.

However, according to the application deployment method provided in this embodiment of this application, because an executable command is added after an application blueprint, the deployment apparatus can execute the executable command after downloading an application resource. The process such as copying, transmission, downloading, decompressing, or installation can be implemented provided that the technical personnel configure a proper executable command on the application blueprint. Therefore, no special script needs to be written, thereby reducing a time consumed by script writing. In addition, because the application blueprints and the resource indexes have simple formats, an orchestration requirement is also reduced, and a correspondence required during application deployment can be quickly written with only simple basic knowledge. Further, plug and play may be supported in an application relationship deployment process, and application deployment can be quickly implemented.

In addition, in the conventional procedure-oriented application deployment method, targeted task scripts corresponding to different application environments need to be written, and consequently, a task script has relatively poor reusability. However, according to the application deployment method provided in this embodiment of this application, for an application, only at least one correspondence for application deployment needs to be established. The correspondence only needs to be newly established or adjusted in different application environments. The correspondence has relatively high reusability.

In addition, in the conventional procedure-oriented application deployment method, if a plurality of applications need to be simultaneously deployed, or a plurality of tasks of one application need to be simultaneously deployed, a deployment engine needs to simultaneously send a large quantity of task scripts and application resources to the deployment apparatus. Consequently, load of the deployment engine is increased, a network bandwidth requirement is relatively high, and a system bottleneck is easily caused.

However, according to the application deployment method provided in this embodiment of this application, because the correspondence for application deployment is actually concatenation of some simple strings, occupied network bandwidth is relatively low, thereby leading to relatively little impact on load of the registration center.

Further, in this embodiment of this application, the application resource may be an application installation package, an application plug-in, an application configuration file, an executable file, a code file, or a differential application package. When the application resource is the application plug-in or a differential application resource, an incremental update of an application can be implemented, network bandwidth requirement can be reduced, and an application deployment speed can be increased.

It should be noted that a sequence of the steps of the application deployment method provided in this embodiment of this application may be properly adjusted, and a step may also be added or reduced accordingly. For example, some steps in step 201 and step 202 may be interchanged. Any variation method readily figured out by a person skilled in the art within the technical scope disclosed in this application shall fall within the protection scope of this application. Therefore, details are not described.

Figure 3A:
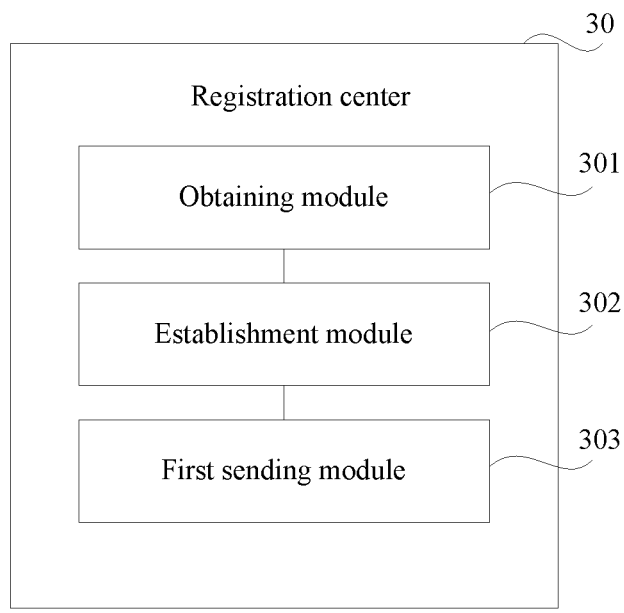
FIG. 3A is a structural block diagram of a registration center according to an embodiment of this application.

FIG. 3A shows a registration center 30 according to an example embodiment. The registration center may be the registration center in the foregoing method embodiment. The registration center 30 includes an obtaining module 301, an establishment module 302, and a first sending module 303.

The obtaining module 301 is configured to obtain application blueprints and resource indexes of a to-be-deployed application that are allocated to a deployment apparatus, where the application blueprints include resource storage paths and executable commands, and the resource indexes include resource obtaining addresses.

The establishment module 302 is configured to establish n correspondences among the application blueprints, the resource indexes, and agent identifiers based on the application blueprints and the resource indexes of the to-be-deployed application, where the agent identifier is used to uniquely identify the deployment apparatus, and n is an integer greater than or equal to 1.

The first sending module 303 is configured to send the deployment command to the deployment apparatus, where the deployment command includes the n correspondences, and the deployment command is used to instruct the deployment apparatus to obtain an application resource based on a resource obtaining address in each correspondence, store the application resource based on a resource storage path, and execute an executable command after storing the application resource.

In conclusion, based on the registration center provided in this embodiment of this application, because the application blueprints and the resource indexes that are obtained by the obtaining module have simple formats, a correspondence required during application deployment can be quickly written with only simple basic knowledge, and there is no need to write a complex task script, thereby reducing an orchestration requirement. Therefore, application deployment complexity is reduced, and application deployment efficiency is increased.

Figure 3B:
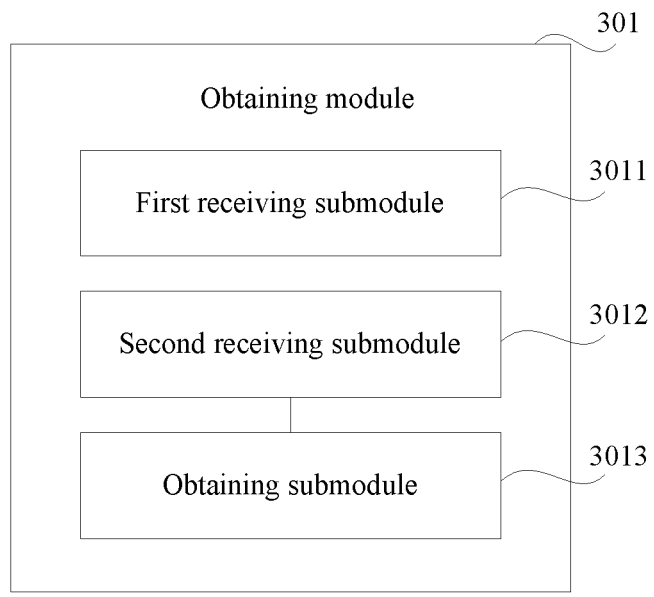
FIG. 3B is a structural block diagram of an obtaining module of a registration center according to an embodiment of this application.

Optionally, as shown in FIG. 3B, the obtaining module 301 includes a first receiving submodule 3011, a second receiving submodule 3012, and an obtaining submodule 3013.

The first receiving submodule 3011 is configured to receive m resource indexes of the to-be-deployed application, where application resources corresponding to the m resource indexes constitute an integrated to-be-deployed resource of the to-be-deployed application in a specified application environment, and m is an integer greater than or equal to 1.

The second receiving submodule 3012 is configured to receive p application blueprints of the to-be-deployed application, where storage paths of the p application blueprints correspond to the m resource indexes.

The obtaining submodule 3013 is configured to, after a subscription instruction of the deployment apparatus is received, obtain at least one of the m resource indexes as a resource index that is of the to-be-deployed application and that is allocated to the deployment apparatus, and obtain the p application blueprints as application blueprints of the to-be-deployed application that are allocated to the deployment apparatus, when the deployment apparatus is an apparatus in the specified application environment.

Correspondingly, the obtaining submodule 3013 may be configured to determine at least one target deployment apparatus used to deploy an integrated to-be-deployed resource in the specified application environment, where the at least one target deployment apparatus includes the deployment apparatus, allocate a resource index of the m resource indexes to each target deployment apparatus, and allocate an application blueprint of the p application blueprints to each target deployment apparatus.

Figure 3C:
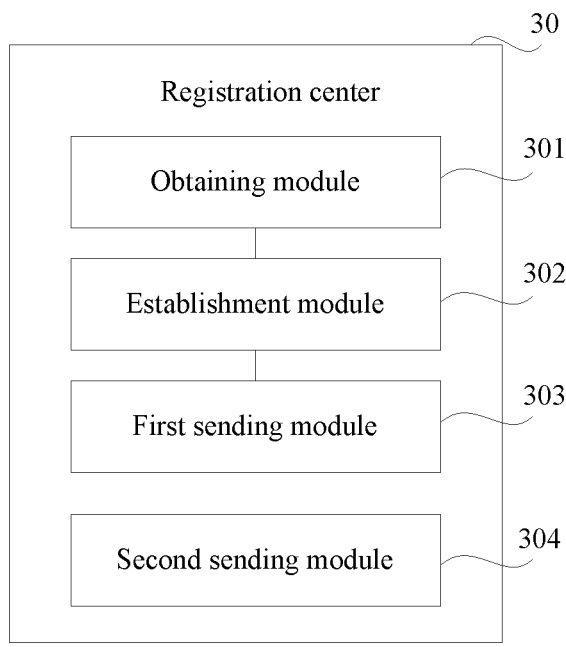
FIG. 3C is a structural block diagram of another registration center according to an embodiment of this application.

FIG. 3C shows a registration center 30 according to an example embodiment. The registration center 30 may include an obtaining module 301, an establishment module 302, a first sending module 303, and a second sending module 304.

The second sending module 304 is configured to send a first update command to the deployment apparatus when any element in a first correspondence changes, where the first update command includes a second correspondence, the second correspondence is an updated first correspondence, an application blueprint identifier in the first correspondence is the same as an application blueprint identifier in the second correspondence, and the first correspondence is any one of the n correspondences.

Figure 3D:
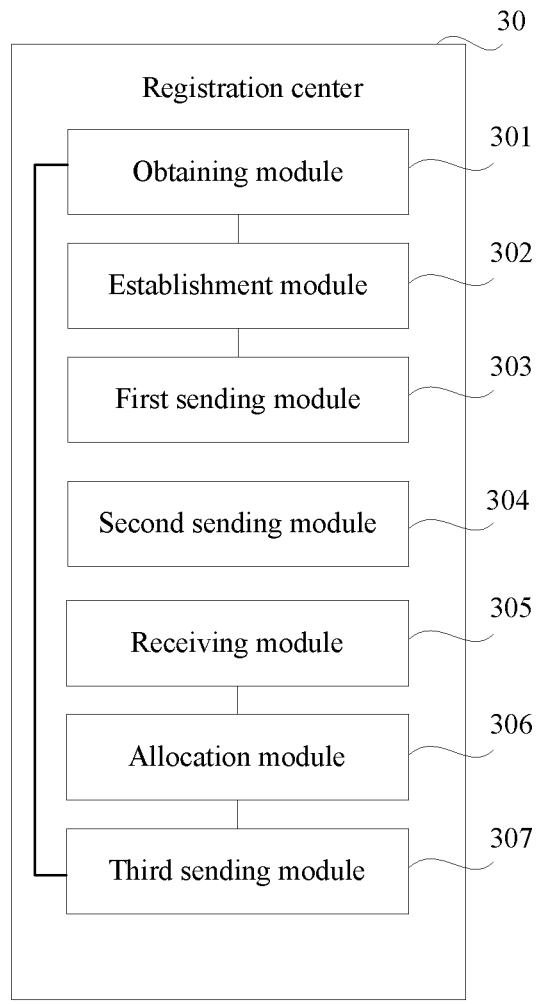
FIG. 3D is a structural block diagram of still another registration center according to an embodiment of this application.

FIG. 3D shows a registration center 30 according to an example embodiment. The registration center 30 includes an obtaining module 301, an establishment module 302, a first sending module 303, a second sending module 304, a receiving module 305, an allocation module 306, and a third sending module 307.

The receiving module 305 is configured to receive, before the application blueprints and the resource indexes that are allocated to the deployment apparatus are obtained, a registration request sent by the deployment apparatus.

The allocation module 306 is configured to allocate the agent identifier to the deployment apparatus based on the registration request.

The third sending module 307 is configured to send a registration request response to the deployment apparatus, where the registration request response includes the agent identifier.

Optionally, the first sending module 303 may be configured to send the deployment command to the deployment apparatus through a first application programming interface of the registration center.

In this embodiment of this application, the application resource may include an application installation resource, an application configuration file, an executable file, a code file, or a differential application package.

Figure 4A:
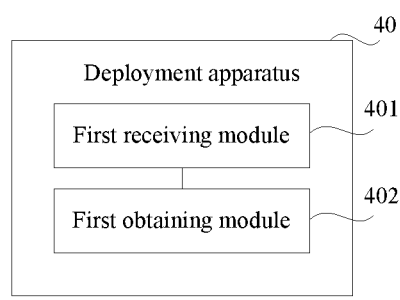
FIG. 4A is a structural block diagram of a deployment apparatus according to an embodiment of this application.

FIG. 4A shows a deployment apparatus 40 according to an example embodiment. The deployment apparatus 40 may include a first receiving module 401 and a first obtaining module 402.

The first receiving module 401 is configured to receive a deployment command sent by the registration center, where the deployment command includes n correspondences among application blueprints, resource indexes, and agent identifiers, the agent identifier is used to uniquely identify the deployment apparatus, the application blueprints include resource storage paths and executable commands, and the resource indexes include resource obtaining addresses.

The first obtaining module 402 is configured to obtain an application resource based on a resource obtaining address in each correspondence, store the application resource based on a resource storage path, and execute an executable command after storing the application resource.

Figure 4B:
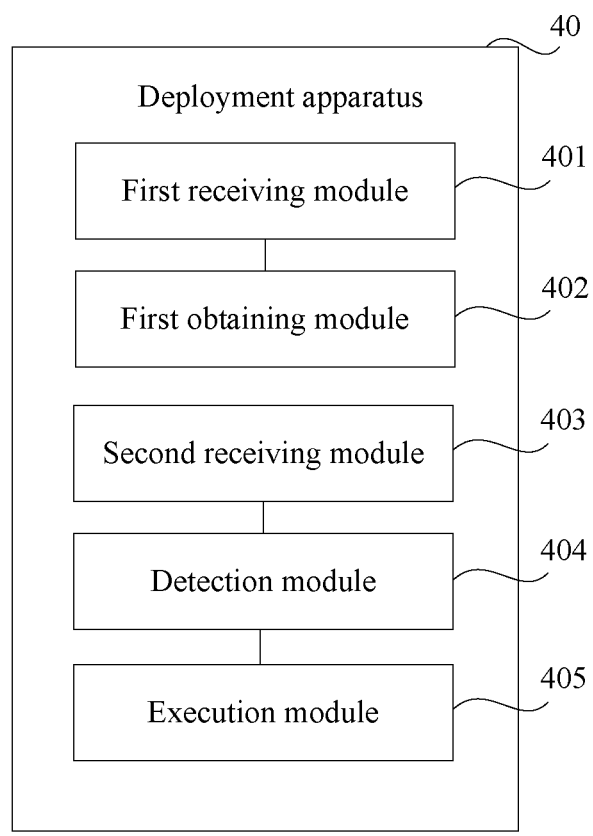
FIG. 4B is a structural block diagram of another deployment apparatus according to an embodiment of this application.

FIG. 4B shows a deployment apparatus 40 according to an example embodiment. The application blueprints further include application blueprint identifiers, application blueprint identifiers allocated by the registration center are in a one-to-one correspondence with application resources stored in a resource server, and the deployment apparatus 40 may include a first receiving module 401, a first obtaining module 402, a second receiving module 403, a detection module 404, and an execution module 405.

The second receiving module 403 is configured to receive a first update command sent by the registration center, where the first update command is a command sent by the registration center to the deployment apparatus after the registration center detects that any element in a first correspondence changes, the first update command includes a second correspondence, the first correspondence is any one of the n correspondences, the second correspondence is an updated first correspondence, and an application blueprint identifier in the first correspondence is the same as an application blueprint identifier in the second correspondence.

The detection module 404 is configured to detect a target element that changes in the second correspondence.

The execution module 405 is configured to perform, based on the second correspondence, an action corresponding to the target element.

The execution module 405 may be configured to, when the target element includes a resource obtaining address and/or a resource storage path, obtain an application resource based on the resource obtaining address in the second correspondence, and execute an executable command in the second correspondence after storing the application resource based on the resource storage path in the second correspondence, and when the target element is the executable command, execute the executable command in the second correspondence.

In addition, the execution module 405 may be configured to, and when the target element includes a resource storage path, obtain a locally stored application resource based on a first resource storage path in the first correspondence, and store the application resource again based on a second resource storage path in the second correspondence, and replace the locally stored first correspondence with the second correspondence.

Figure 4C:
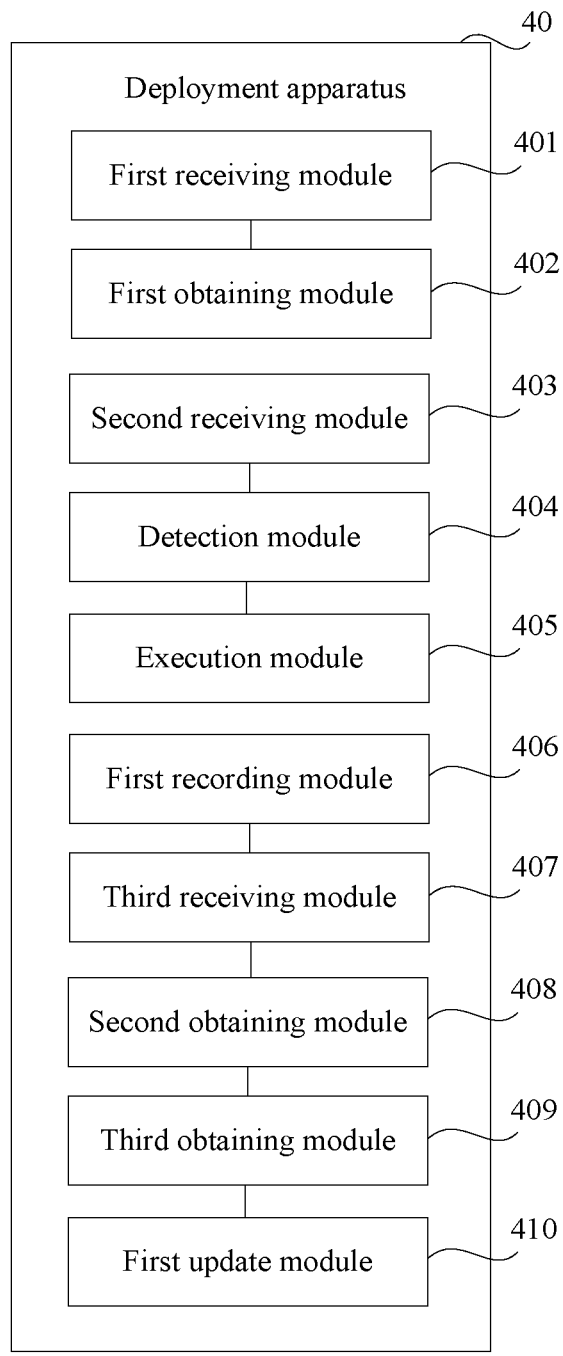
FIG. 4C is a structural block diagram of still another deployment apparatus according to an embodiment of this application.

FIG. 4C shows a deployment apparatus 40 according to an example embodiment. The deployment apparatus 40 includes a first receiving module 401, a first obtaining module 402, a second receiving module 403, a detection module 404, an execution module 405, a first recording module 406, a third receiving module 407, a second obtaining module 408, a third obtaining module 409, and a first update module 410.

The first recording module 406 is configured to record a correspondence between the first resource storage path and the second resource storage path after the locally stored application resource is obtained based on the first resource storage path in the first correspondence, and the application resource is stored again based on the second resource storage path in the second correspondence.

The third receiving module 407 is configured to receive a rollback instruction sent by the registration center, where the rollback instruction is used to instruct to roll back a storage status of an application resource to a previous storage status.

The second obtaining module 408 is configured to obtain the second resource storage path from the currently stored second correspondence.

The third obtaining module 409 is configured to obtain the first resource storage path based on the correspondence between the first resource storage path and the second resource storage path.

The first update module 410 is configured to update the second resource storage path in the currently stored second correspondence to the first resource storage path.

Figure 4D:
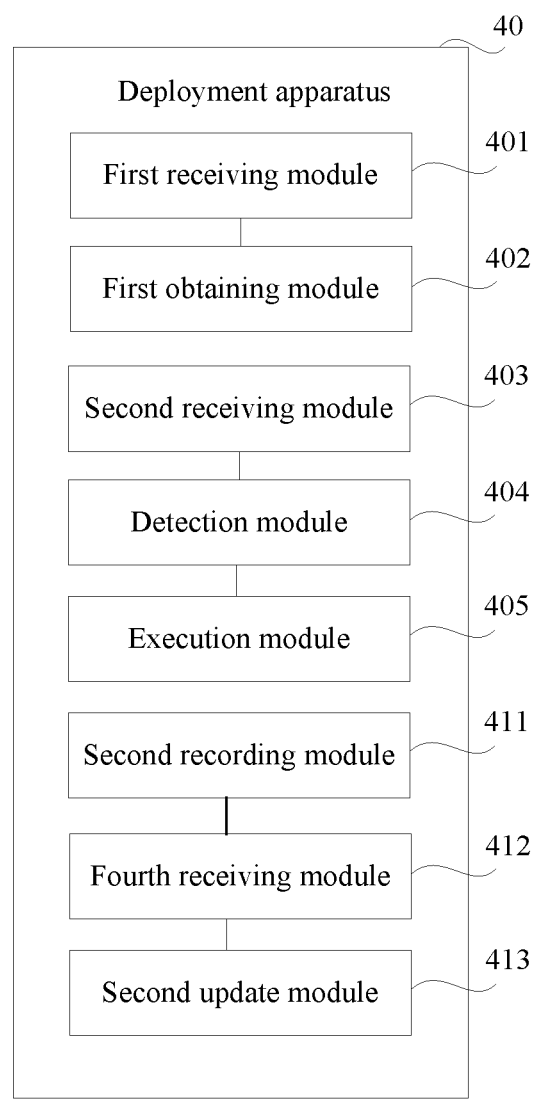
FIG. 4D is a structural block diagram of yet another deployment apparatus according to an embodiment of this application.

FIG. 4D shows a deployment apparatus 40 according to an example embodiment. The deployment apparatus 40 may include a first receiving module 401, a first obtaining module 402, a second receiving module 403, a detection module 404, an execution module 405, a second recording module 411, a fourth receiving module 412, and a second update module 413.

The second recording module 411 is configured to record a correspondence between the first resource storage path and the second resource storage path after the locally stored application resource is obtained based on the first resource storage path in the first correspondence, and the application resource is stored again based on the second resource storage path in the second correspondence.

The fourth receiving module 412 is configured to receive a second update command sent by the registration center, where the second update command is a command sent by the registration center to the deployment apparatus after the registration center detects that any element in the second correspondence changes, the update command includes a third correspondence, and the third correspondence is an updated second correspondence.

The second update module 413 is configured to when only resource storage paths in the third correspondence and the second correspondence are different, and the resource storage path in the third correspondence is the same as the first resource storage path recorded in the correspondence, update the second resource storage path in the second correspondence to the first resource storage path.

Figure 4E:
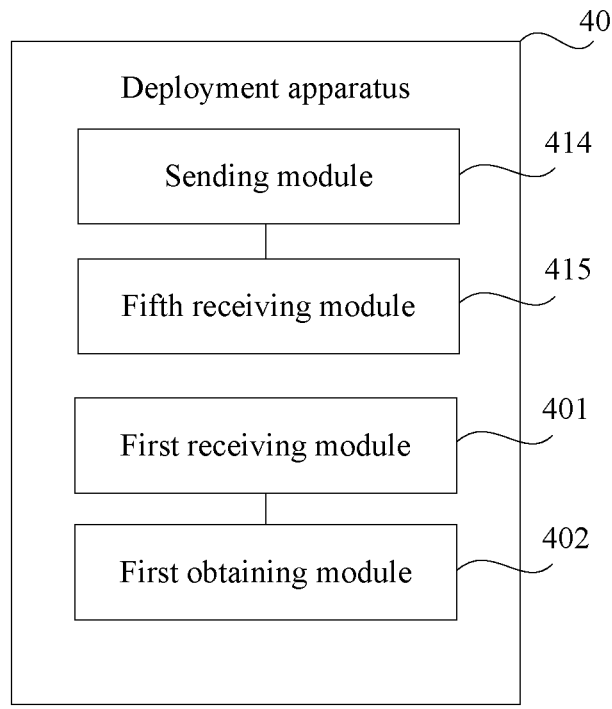
FIG. 4E is a structural block diagram of a deployment apparatus according to an embodiment of this application.

FIG. 4E shows a deployment apparatus 40 according to an example embodiment. The deployment apparatus 40 may include a first receiving module 401, a first obtaining module 402, a sending module 414, and a fifth receiving module 415.

The sending module 414 is configured to send a registration request to the registration center before the deployment command sent by the registration center is received.

The fifth receiving module 415 is configured to receive a registration request response sent by the registration center, where the registration request response includes the agent identifier.

Optionally, the sending module 414 is configured to obtain configuration information, where the configuration information includes information about a first application programming interface of the registration center, and send the registration request to the registration center through the first application programming interface of the registration center.

The first receiving module 401 is configured to receive, through the first application programming interface of the registration center, the deployment command sent by the registration center.

In conclusion, based on the deployment apparatus provided in this embodiment of this application, because the application blueprints and the resource indexes that are received by the first receiving module have simple formats, a correspondence required during application deployment can be quickly written with only simple basic knowledge, and there is no need to write a complex task script, thereby reducing an orchestration requirement. Therefore, application deployment complexity is reduced, and application deployment efficiency is increased.

An embodiment of this application provides a deployment system. The system includes any one of the foregoing registration centers 30 and any one of the foregoing deployment apparatuses 40.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

Figure 5:
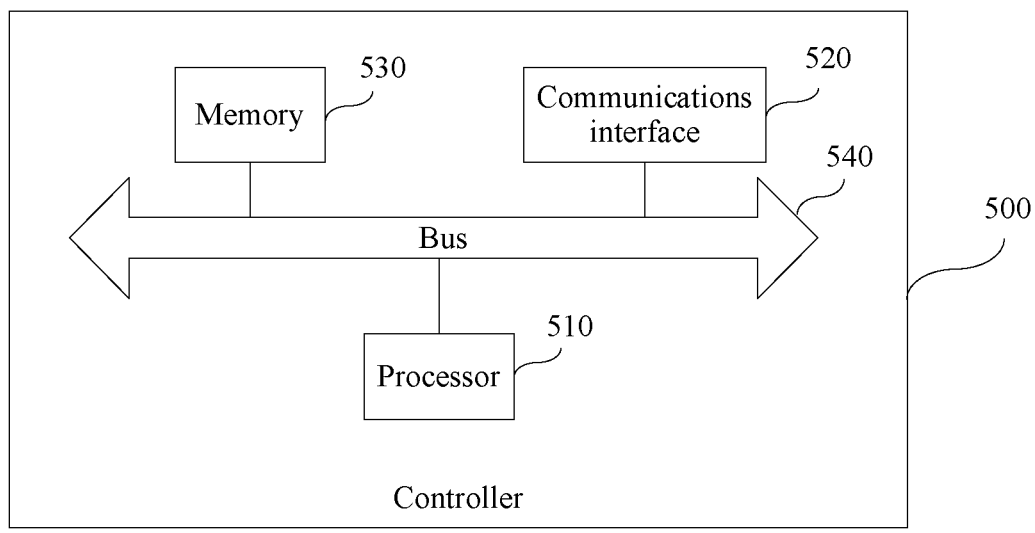
FIG. 5 is a structural block diagram of a controller according to an embodiment of this application.

FIG. 5 is a schematic structural diagram of a controller 500 according to an embodiment of this application. Referring to FIG. 5, the controller 500 includes a processor 510, a communications interface 520, and a memory 530. The communications interface 520 and the memory 530 are separately connected to the processor 510. For example, as shown in FIG. 5, the communications interface 520 and the memory 530 are connected to the processor 510 using a bus 540.

The processor 510 may be a central processing unit (CPU), and the processor 510 includes one or more processing cores. The processor 510 runs a software program, to perform various function applications and data processing.

There may be a plurality of communications interfaces 520, and the communications interface 520 is configured by the controller 500 to communicate with an external device. For example, the external device is a display or a third-party device (such as a storage device or a mobile terminal).

The memory 530 may include, but is not limited to a random access memory (RAM), a read only memory (ROM), an erasable programmable ROM (EPROM), a flash memory, and an optical memory. The memory 530 is responsible for information storage. For example, the memory 530 is configured to store a software program.

Optionally, the controller 500 may further include an input/output (I/O) interface (not shown in FIG. 5). The I/O interface is connected to the processor 510, the communications interface 520, and the memory 530.

For example, the I/O interface may be a universal serial bus (USB).

In this embodiment of this application, the processor 510 is configured to execute an instruction stored in the memory 530, to implement the application deployment method provided in the embodiment shown in FIG. 2A and FIG. 2B.

The processor 510 may be configured to perform step 201, step 205, and step 208, for example, obtaining application blueprints and resource indexes of a to-be-deployed application that are allocated to a deployment apparatus, where the application blueprints include resource storage paths and executable commands, and the resource indexes include resource obtaining addresses, establishing n correspondences among the application blueprints, the resource indexes, and agent identifiers based on the application blueprints and the resource indexes of the to-be-deployed application, where the agent identifier is used to uniquely identify the deployment apparatus, and n is an integer greater than or equal to 1, and sending the deployment command to the deployment apparatus, where the deployment command includes the n correspondences, and the deployment command is used to instruct the deployment apparatus to obtain an application resource based on a resource obtaining address in each correspondence, store the application resource based on a resource storage path, and execute an executable command after storing the application resource.

Alternatively, the processor 510 may be configured to perform steps 201, 202, 203, 204, and 207, for example, receiving a deployment command sent by the registration center, where the deployment command includes n correspondences among application blueprints, resource indexes, and agent identifiers, the agent identifier is used to uniquely identify the deployment apparatus, the application blueprints include resource storage paths and executable commands, and the resource indexes include resource obtaining addresses, and obtaining an application resource based on a resource obtaining address in each correspondence, storing the application resource based on a resource storage path, and executing an executable command after storing the application resource.

It should be noted that, for the application deployment apparatus provided in the foregoing embodiment, division of the foregoing function modules is merely used as an example for description. In actual application, based on a requirement, the foregoing functions may be allocated to and completed by different function modules. That is, an internal structure of a device is divided into different function modules, to complete all or some of the functions described above. In addition, the application deployment apparatus and the application deployment method that are provided in the foregoing embodiments belong to a same concept. For a detailed implementation process, refer to the method embodiment. Details are not described herein again.

The term "and/or" in this application describes only an association relationship for describing associated objects and represents that three relationships may exist. For example, A and/or B may represent the following three cases only A exists, both A and B exist, and only B exists. In addition, the character "/" in this specification generally indicates an "or" relationship between the associated objects.

The foregoing descriptions are merely specific implementations of this application and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An application deployment method, implemented by a registration center, wherein the application deployment method comprises:
   obtaining an application blueprint, wherein the application blueprint is configured to deploy a to-be-deployed application;
   obtaining a resource obtaining address, wherein the resource obtaining address is an address of an application installation package of the to-be-deployed application;
   establishing a correspondence between the application blueprint and the resource obtaining address; and
   sending a deployment command to a deployment apparatus,
   wherein the deployment command comprises the application blueprint and the corresponding resource obtaining address, and
   wherein the deployment command is configured to instruct the deployment apparatus to obtain the application installation package based on the resource obtaining address and install the application installation package.

2. The application deployment method of claim 1, further comprising:
   receiving a registration request from the deployment apparatus; and
   allocating an agent identifier to the deployment apparatus based on the registration request,
   wherein the agent identifier is configured to identify the deployment apparatus.

3. The application deployment method of claim 2, further comprising establishing a correspondence among the application blueprint, the resource obtaining address, and the agent identifier, wherein the deployment command further comprises the corresponding agent identifier.

4. The application deployment method of claim 1, wherein the application blueprint comprises an executable command for instructing the deployment apparatus to install the application installation package of the to-be-deployed application.

5. The application deployment method of claim 1, further comprising providing an operation page, wherein the operation page is configured to obtain inputting information from a control end, and wherein obtaining the application blueprint further comprises obtaining the application blueprint through the operation page.

6. The application deployment method of claim 5, wherein establishing the correspondence further comprises establishing the correspondence through the operation page.

7. The application deployment method of claim 1, wherein the application blueprint comprises a blueprint identifier, and wherein the blueprint identifier is configured to identify the application blueprint.

8. The application deployment method of claim 1, wherein sending the deployment command to the deployment apparatus comprises sending the deployment command to the deployment apparatus through a first application programming interface of the registration center.

9. The application deployment method of claim 1, wherein the deployment apparatus is a mobile device, and wherein the mobile device is a smartphone, a computer, a multimedia player, an e-reader, or a wearable device.

10. The application deployment method of claim 5, wherein the control end comprises a third-party system.

11. A controller, comprising:
    an interface configured to communicate with a deployment apparatus; and
    a processor coupled to the interface and configured to:
       obtain an application blueprint, wherein the application blueprint is configured to deploy a to-be-deployed application;
       obtain a resource obtaining address, wherein the resource obtaining address is an address of an application installation package of the to-be-deployed application;
       establish a correspondence between the application blueprint and the resource obtaining address; and
       send a deployment command to the deployment apparatus through the interface,
       wherein the deployment command comprises the application blueprint and the corresponding resource obtaining address, and
       wherein the deployment command is configured to instruct the deployment apparatus to obtain the application installation package based on the resource obtaining address and install the application installation package.

12. The controller of claim 11, wherein the processor is further configured to:
receive a registration request from the deployment apparatus; and
allocate an agent identifier to the deployment apparatus based on the registration request,
wherein the agent identifier is configured to identify the deployment apparatus.

13. The controller of claim 12, wherein the processor is further configured to establish a correspondence among the application blueprint, the resource obtaining address, and the agent identifier, and wherein the deployment command further comprises the corresponding agent identifier.

14. The controller of claim 11, wherein the application blueprint comprises an executable command for instructing the deployment apparatus to install the application installation package.

15. The controller of claim 11, wherein the processor is further configured to:
provide an operation page, wherein the operation page is configured to obtain inputting information from a control end; and
obtain the application blueprint through the operation page.

16. The controller of claim 15, wherein the processor is further configured to establish the correspondence through the operation page.

17. The controller of claim 11, wherein the application blueprint comprises a blueprint identifier, and wherein the blueprint identifier is configured to identify the application blueprint.

18. The controller of claim 11, wherein the processor is further configured to send the deployment command to the deployment apparatus through a first application programming interface of a registration center.

19. The controller of claim 11, wherein the deployment apparatus comprises a mobile device, and wherein the mobile device is a smartphone, a computer, a multimedia player, an e-reader, or a wearable device.

20. A computer program product comprising computer-executable instructions stored on a non-transitory computer-readable medium that, when executed by a processor of a computing device, cause the computing device to:
obtain an application blueprint, wherein the application blueprint is configured to deploy a to-be-deployed application;
obtain a resource obtaining address, wherein the resource obtaining address is an address of an application installation package of the to-be-deployed application;
establish a correspondence between the application blueprint and the resource obtaining address; and
send a deployment command to a deployment apparatus,
wherein the deployment command comprises the application blueprint and the corresponding resource obtaining address, and
wherein the deployment command is configured to instruct the deployment apparatus to obtain the application installation package based on the resource obtaining address and install the application installation package.

* * * * *